US010063357B2

(12) United States Patent
Kim et al.

(10) Patent No.: US 10,063,357 B2
(45) Date of Patent: Aug. 28, 2018

(54) METHOD FOR SUPPORTING REFERENCE SIGNAL TRANSMISSION IN MULTIPLE ANTENNA-SUPPORTING WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Kijun Kim, Seoul (KR); Inkwon Seo, Seoul (KR); Hyukjin Chae, Seoul (KR); Jonghyun Park, Seoul (KR); Hanjun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 35 days.

(21) Appl. No.: 15/104,431

(22) PCT Filed: Dec. 18, 2014

(86) PCT No.: PCT/KR2014/012526
§ 371 (c)(1),
(2) Date: Jun. 14, 2016

(87) PCT Pub. No.: WO2015/093866
PCT Pub. Date: Jun. 25, 2015

(65) Prior Publication Data
US 2016/0315745 A1 Oct. 27, 2016

Related U.S. Application Data

(60) Provisional application No. 61/917,944, filed on Dec. 19, 2013.

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0469* (2013.01); *H04B 7/0632* (2013.01);
(Continued)

(58) Field of Classification Search
CPC .. H04B 7/0469; H04B 7/0632; H04B 7/0634; H04W 36/0055; H04L 5/0023; H04L 5/0048

See application file for complete search history.

(56) References Cited

U.S. PATENT DOCUMENTS

2012/0170679 A1  7/2012  Koo et al.
2013/0201966 A1  8/2013  Weng et al.
(Continued)

FOREIGN PATENT DOCUMENTS

JP  2006-500873 A  1/2006
JP  2006-505224 A  2/2006
(Continued)

OTHER PUBLICATIONS

Alcatel-Lucent et al., "UL SRS Enhancements to Support CoMP and Transmit Diversity," 3GPP TSG-RAN WG1 #59bis, R1-100434, Valencia, Spain, Jan. 18-22, 2010 (EPO Server date Jan. 12, 2010), pp. 1-3, XP050418080.

*Primary Examiner* — Paul H Masur
(74) *Attorney, Agent, or Firm* — Birch, Stewart, Kolasch & Birch, LLP

(57) ABSTRACT

The present invention relates to a method and an apparatus for transmitting a reference signal in a multiple antenna-supporting wireless communication system and, more specifically, to a method for a serving cell to support reference signal transmission of a neighbor cell in a multiple antenna-supporting wireless communication system, the method comprising: transmitting a sounding reference signal (SRS) configuration to a terminal; transmitting, to the neighbor
(Continued)

cell, the SRS configuration and a terminal-related position information; and receiving, from the neighbor cell, an SRS-based first channel quality value which is estimated according to the SRS configuration, wherein the first channel quality value is estimated by applying a receiving vector according to the terminal-related position information.

8 Claims, 30 Drawing Sheets

(51) Int. Cl.
*H04B 7/06* (2006.01)
*H04W 36/00* (2009.01)

(52) U.S. Cl.
CPC ......... *H04B 7/0634* (2013.01); *H04L 5/0023* (2013.01); *H04W 36/0055* (2013.01); *H04L 5/0055* (2013.01)

(56) References Cited

U.S. PATENT DOCUMENTS

| | | |
|---|---|---|
| 2013/0229985 A1 | 9/2013 | Kim et al. |
| 2013/0237274 A1 | 9/2013 | Kwon et al. |
| 2013/0308473 A1 | 11/2013 | Sun et al. |
| 2013/0329612 A1 | 12/2013 | Seo et al. |
| 2015/0029957 A1* | 1/2015 | Han ............ H04W 76/02 370/329 |
| 2015/0372724 A1* | 12/2015 | Deng ............ H04B 7/024 375/299 |
| 2016/0036571 A1* | 2/2016 | Park ............ H04B 7/024 370/330 |
| 2016/0285602 A1* | 9/2016 | Fang ............ H04W 24/02 |

FOREIGN PATENT DOCUMENTS

| | | |
|---|---|---|
| JP | 2012-501132 A | 1/2012 |
| WO | WO 2013/119096 A1 | 8/2013 |

* cited by examiner

FIG. 13
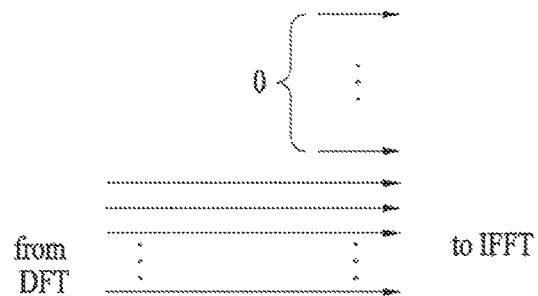
(a)
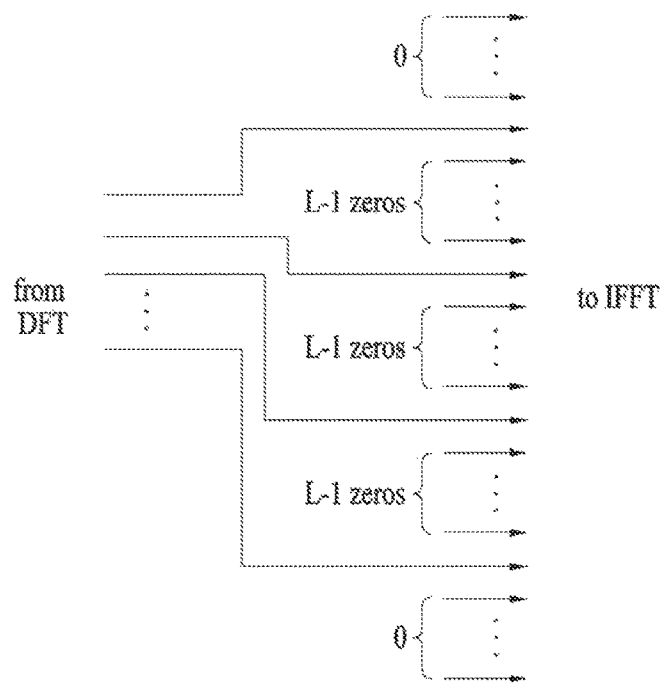
(b)

FIG. 15
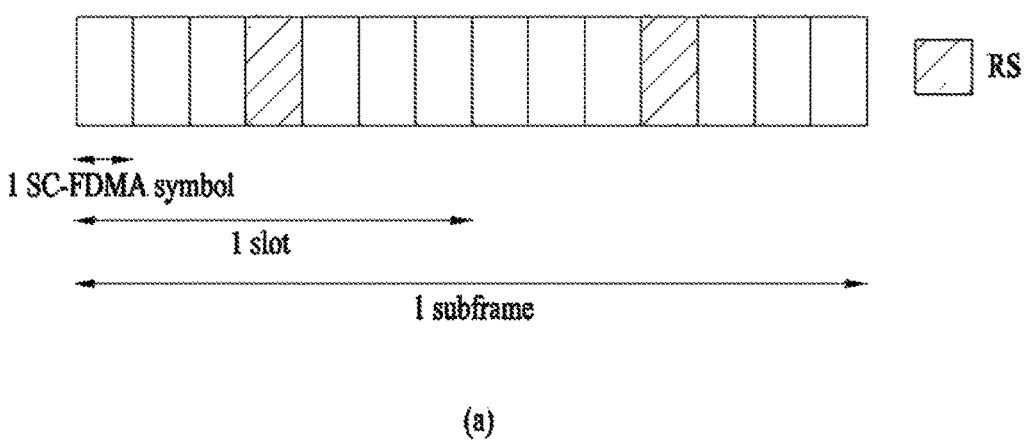
(a)
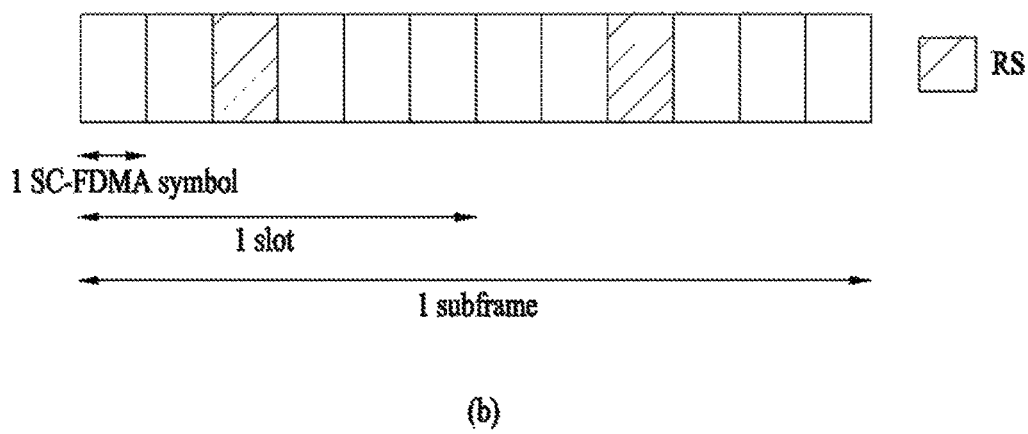
(b)

METHOD FOR SUPPORTING REFERENCE SIGNAL TRANSMISSION IN MULTIPLE ANTENNA-SUPPORTING WIRELESS COMMUNICATION SYSTEM, AND APPARATUS THEREFOR

CROSS REFERENCE TO RELATED APPLICATIONS

This application is the National Phase of PCT International Application No. PCT/KR2014/012526, filed on Dec. 18, 2014, which claims priority under 35 U.S.C. 119(e) to U.S. Provisional Application No. 61/917,944, filed on Dec. 19, 2013, all of which are hereby expressly incorporated by reference into the present application.

TECHNICAL FIELD

The present invention relates to a wireless communication system and, more particularly, to a method supporting reference signal transmission in a wireless communication system supporting multiple antennas and an apparatus therefor.

BACKGROUND ART

MIMO (multi-input multi-output) technology means a method of improving data transceiving efficiency by adopting multiple transmitting antennas and multiple receiving antennas instead of a single transmitting antenna and a single receiving antenna. In particular, this technology increases capacity or enhances performance using multiple antennas in a transmitting or receiving end of a wireless communication system. This MIMO technology may be called multi-antenna technology.

In order to support MIMO transmission, it may be able to use a precoding matrix to appropriately distribute transmission information to each antenna in accordance with a channel status and the like. In the conventional 3GPP (3rd generation partnership project) LTE (long term evolution) system, maximum 4 transmitting antennas are supported for downlink transmission and a corresponding precoding codebook is defined.

DISCLOSURE

Technical Problem

An object of the present invention is to provide a method supporting reference signal transmission in a wireless communication system supporting multiple antennas and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention for achieving the present invention, provided herein is a method supporting reference signal transmission of a neighbor cell by a serving cell in a wireless communication system supporting multiple antennas, including transmitting a sounding reference signal (SRS) configuration to a user equipment (UE), transmitting the SRS configuration and UE associated location information to the neighbor cell, and receiving an SRS based first channel quality value estimated according to the SRS configuration from the neighbor cell, wherein the first channel quality value is estimated by applying a receiving vector according to the UE associated location information.

The first channel quality value may be reference signal received power (RSRP) or reference signal received quality (RSRQ).

The UE associated location information may include at least one of weight information about a horizontal antenna of the UE, weight information about a vertical antenna of the UE, global positioning system (GPS) information of the UE, expected location information of the UE, and information indicating that location information of the UE is not present.

The UE associated location information may be configured to be transmitted only when the neighbor cell includes multi-dimensional antennas.

The method may further include determining whether to hand over the UE by comparing the first channel quality value with a second channel quality value measured by the serving cell. Upon determining that the UE is handed over, the method may further include transmitting a first channel state information-reference signal (CSI-RS) of the serving cell and a second CSI-RS of the neighbor cell to the UE and receiving a handover confirmation message of the UE based on the first CSI-RS and the second CSI-RS.

In another aspect of the present invention for achieving the present invention, provided herein is a method of transmitting a reference signal of a neighbor cell in a wireless communication system supporting multiple antennas, including receiving a sounding reference signal (SRS) configuration configured for a user equipment (UE) by a serving cell and UE associated location information, receiving a channel quality value measured according to the SRS configuration from the UE, and transmitting the channel quality value to the serving cell, wherein the first channel quality value is estimated by the neighbor cell by applying a receiving vector according to the UE associated location information.

In still another aspect of the present invention for achieving the present invention, provided herein is a serving cell supporting reference signal transmission of a neighbor cell in a wireless communication system supporting multiple antennas, including a radio frequency (RF) unit and a processor, wherein the processor is configured to transmit a sounding reference signal (SRS) configuration to a user equipment (UE), transmit the SRS configuration and UE associated location information to the neighbor cell, and receive an SRS based first channel quality value estimated according to the SRS configuration from the neighbor cell, and wherein the first channel quality value is estimated by applying a receiving vector according to the UE associated location information.

The UE associated location information may include at least one of weight information about a horizontal antenna of the UE, weight information about a vertical antenna of the UE, global positioning system (GPS) information of the UE, expected location information of the UE, and information indicating that location information of the UE is not present.

Advantageous Effects

According to an embodiment of the present invention, a reference signal can be efficiently transmitted in a wireless communication system supporting multiple antennas.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 13 is a diagram illustrating a scheme of mapping a DFT-processed signal to a frequency region.

FIG. 15 is a diagram illustrating a symbol position having a reference signal mapped thereto.

BEST MODE

Figure 1:
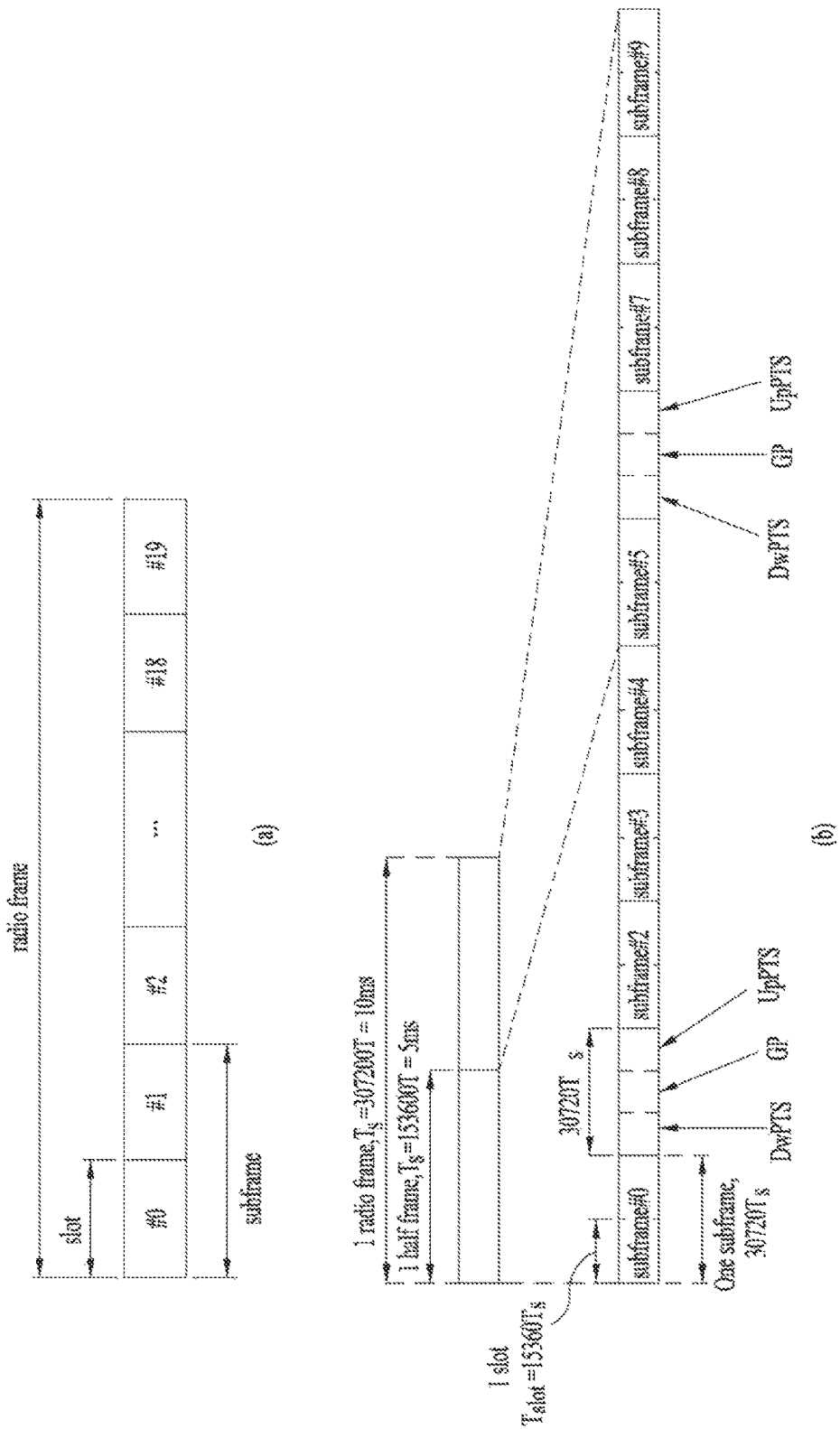
FIG. 1 is a diagram illustrating a structure of a downlink (DL) radio frame.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station; a Node B, an eNode B (eNB), an access point (AP) and the like. Moreover, in this specification, a terminology called a base station may be conceptionally used as including a cell or a sector. Meanwhile, a relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like. In this specification, an uplink transmission entity may mean a terminal or a relay. And, an uplink reception entity may mean a base station or a relay. Similarly, a downlink transmission entity may mean a base station or a relay. And, a downlink reception entity may mean a terminal or a relay. So to speak, an uplink transmission may mean a transmission from a terminal to a base station, a transmission from a terminal to a relay, or a transmission from a relay to a base station. Similarly, a downlink transmission may mean a transmission from a base station to a terminal, a transmission from a base station to a relay, or a transmission from a relay to a terminal.

Specific terminologies used for the following description may be provided to help the understanding of the present invention. And, the use of the specific terminology may be modified into other forms within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

A structure of a downlink (DL) radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, 1 subframe is constructed with 2 slots irrespective of a type of a radio frame.

The above-described structures of the radio frame are just exemplary. And, the number of subframes included in a radio frame, the number of slots included in the subframe and the number of symbols included in the slot may be modified in various ways.

Figure 2:
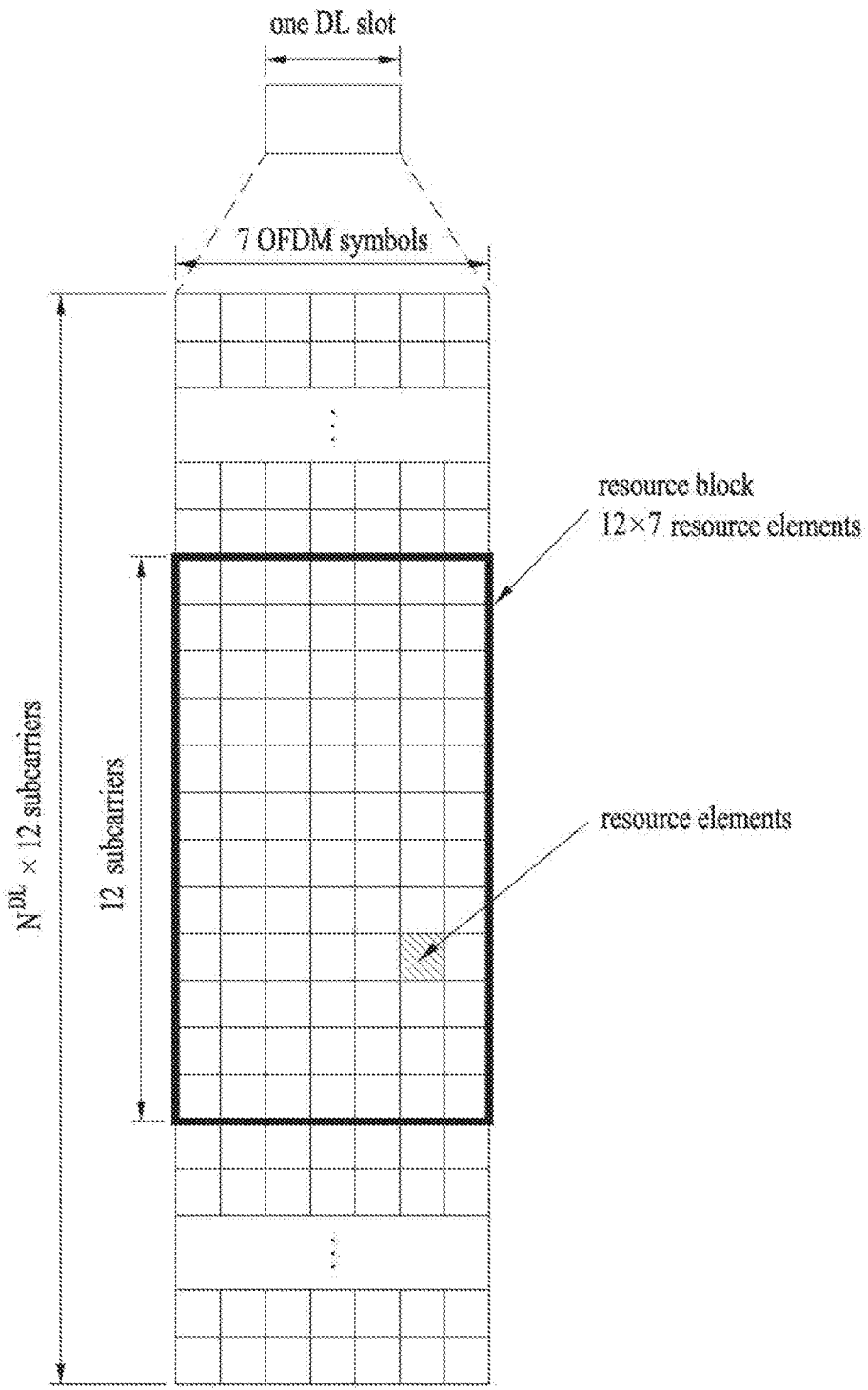
FIG. 2 is a diagram illustrating one example of a resource grid for a DL slot.

FIG. 2 is a diagram for one example of a resource grid for a downlink (DL) slot. This corresponds to a case that OFDM symbol includes a normal CP. Referring to FIG. 2, a downlink slot includes a plurality of OFDM symbols in time domain and includes a plurality of resource blocks in frequency domain. In this case, for example, a single downlink slot includes 7 OFDM symbols and a single resource block includes 12 subcarriers, by which configurations of the downlink slot and the resource block are non-limited. Each element on a resource grid is called a resource element (RE). for instance, a resource element a (k, l) becomes a resource element located at kth subcarrier and lth OFDM symbol. In case of a normal CP, a single resource block includes 12×7 resource elements [in case of an extended CP, 12×6 resource elements are included]. Since an interval of each subcarrier is 15 kHz, a single resource block includes about 180 kHz in frequency domain. NDL indicates the number of resource blocks included in a downlink slot. And, the value of NDL may be determined depending on a downlink transmission bandwidth set up by scheduling of a base station.

Figure 3:
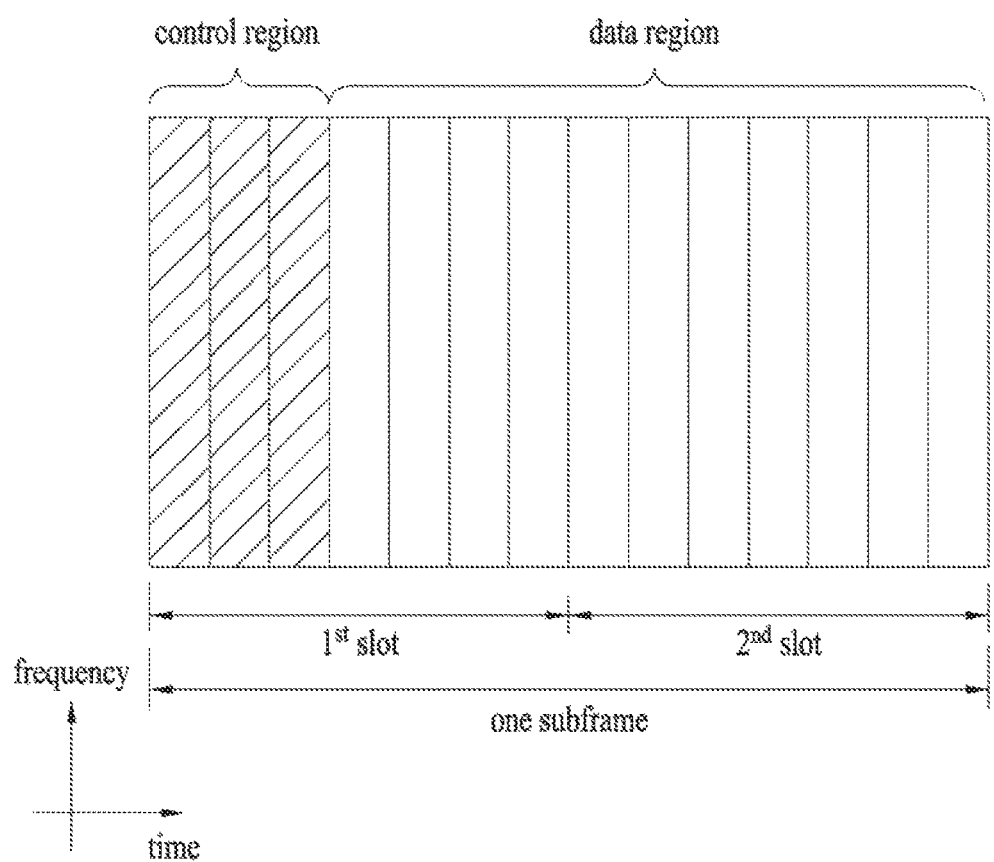
FIG. 3 is a diagram illustrating a structure of a DL subframe.

FIG. 3 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical. Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 4:
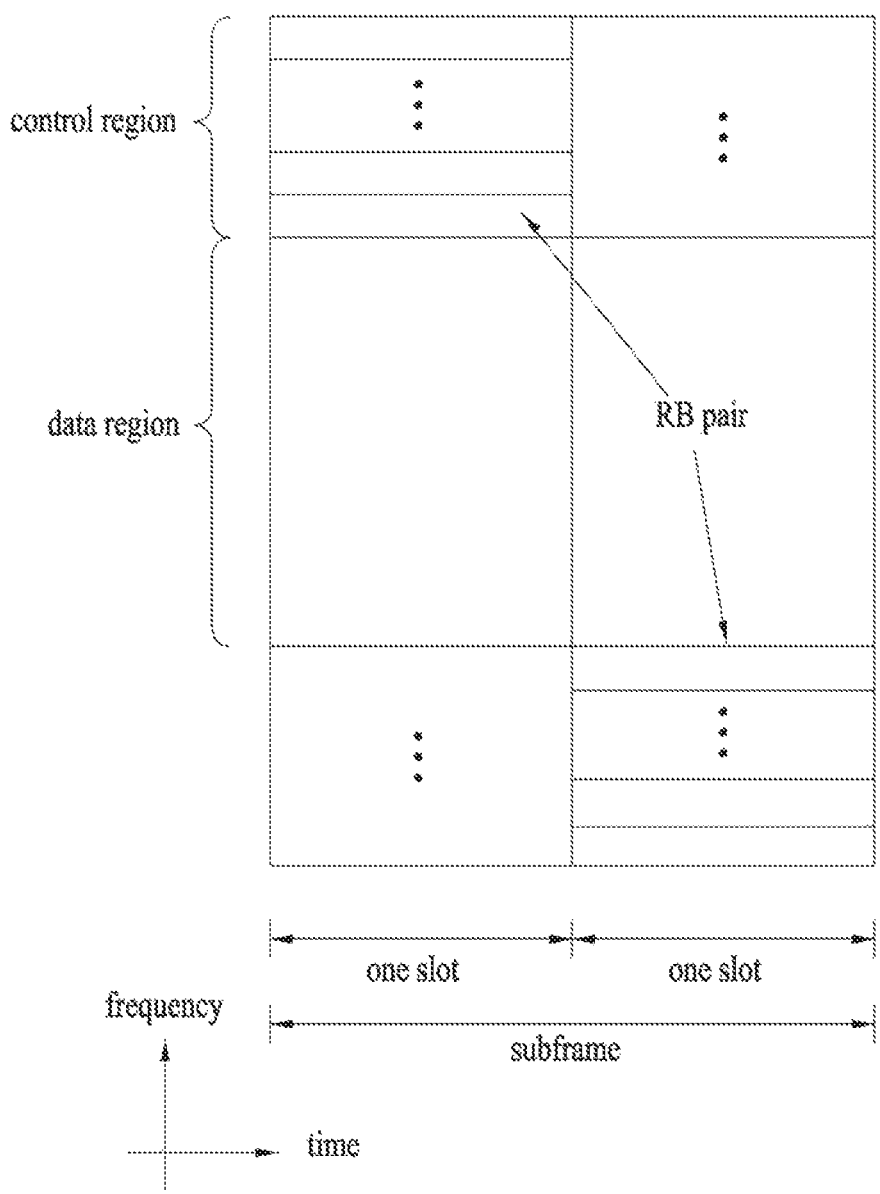
FIG. 4 is a diagram illustrating a structure of an uplink (UL) subframe.

FIG. 4 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Reference Signal

In MIMO system, each transmitting antenna has an independent data channel. A transmitting antenna may mean a virtual antenna or a physical antenna. A receiver receives data transmitted from each transmitting antenna in a manner of estimating a channel for the corresponding transmitting antenna. Channel estimation means a process for reconstructing a received signal by compensating for distortion of a signal caused by fading. In this case, the fading indicates an effect that strength of a signal rapidly fluctuates due to multipath-time delay in a wireless communication system environment. For the channel estimation, a reference signal known to both a transmitter and a receiver is necessary. The reference signal may be simply named RS or a pilot in accordance with an applicable standard.

In the legacy 3GPP LTE Release-8 or -9 system, a downlink reference signal transmitted by a base station is defined. Downlink reference signal is a pilot signal for coherent demodulation of such a channel as PDSCH (Physical Downlink Shared CHannel), PCFICH (Physical Control Format Indicator CHannel), PHICH (Physical Hybrid Indicator CHannel), PDCCH (Physical Downlink Control CHannel) and the like. The downlink reference signal may be categorized into a common reference signal (CRS) shared by all user equipments in a cell and a dedicated reference signal (DRS) for a specific user equipment only. The common reference signal may be called a cell-specific reference signal. And, the dedicated reference signal may be called a user equipment-specific (UE-specific) reference signal or a demodulation reference signal (DMRS).

Downlink reference signal assignment in the legacy 3GPP LTE system is described as follows. First of all, a position (i.e., a reference signal pattern) of a resource element for carrying a reference signal is described with reference to one resource block pair (i.e., 'one subframe length in time domain'×'12-subcarrier length in frequency domain'). A single subframe is configured with 14 OFDM symbols (in case of a normal CP) or 12 OFDM symbols (in case of an extended CP). The number of subcarriers in a single OFDM symbol is set to one of 128, 256, 512, 1024, 1536 and 2048 to use.

Figure 5:
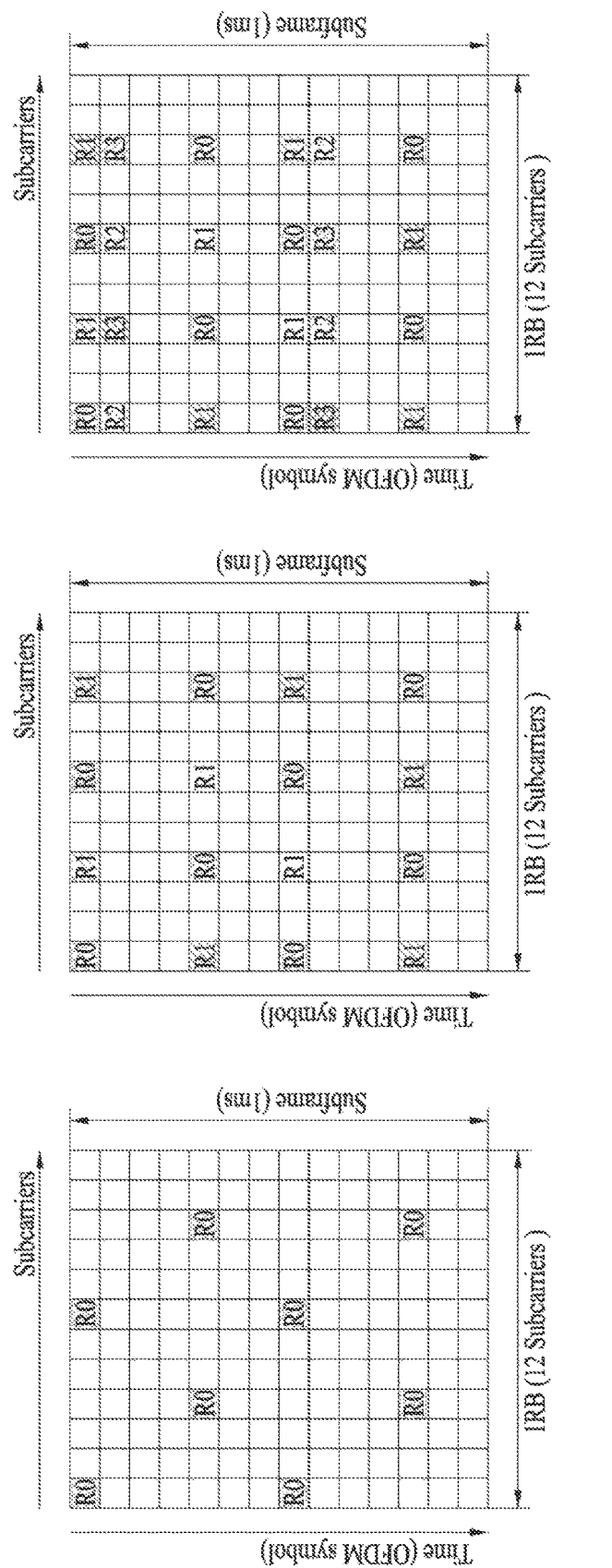
FIG. 5 is a diagram illustrating a pattern of a common reference signal (CRS).

FIG. 5 shows a pattern of a common reference signal (CRS) in case that 1-TTI (i.e., 1 subframe) has 14 OFDM symbols. FIG. 5(a), FIG. 5(b) and FIG. 5(c) relates to a CRS pattern for a system having 1 Tx (transmitting) antenna, a CRS pattern for a system having 2 Tx antennas and a CRS pattern for a system having 4 Tx antennas, respectively.

In FIG. 5, R0 indicates a reference signal for an antenna port index 0. In FIG. 5, R1 indicates a reference signal for an antenna port index 1, R2 indicates a reference signal for an antenna port index 2, and R3 indicates a reference signal for an antenna port index 3. Regarding a position of an RE for carrying a reference signal for each of the antenna ports, no signal is transmitted from the rest of all antenna ports except the antenna port for transmitting a reference signal to prevent interference.

Figure 6:
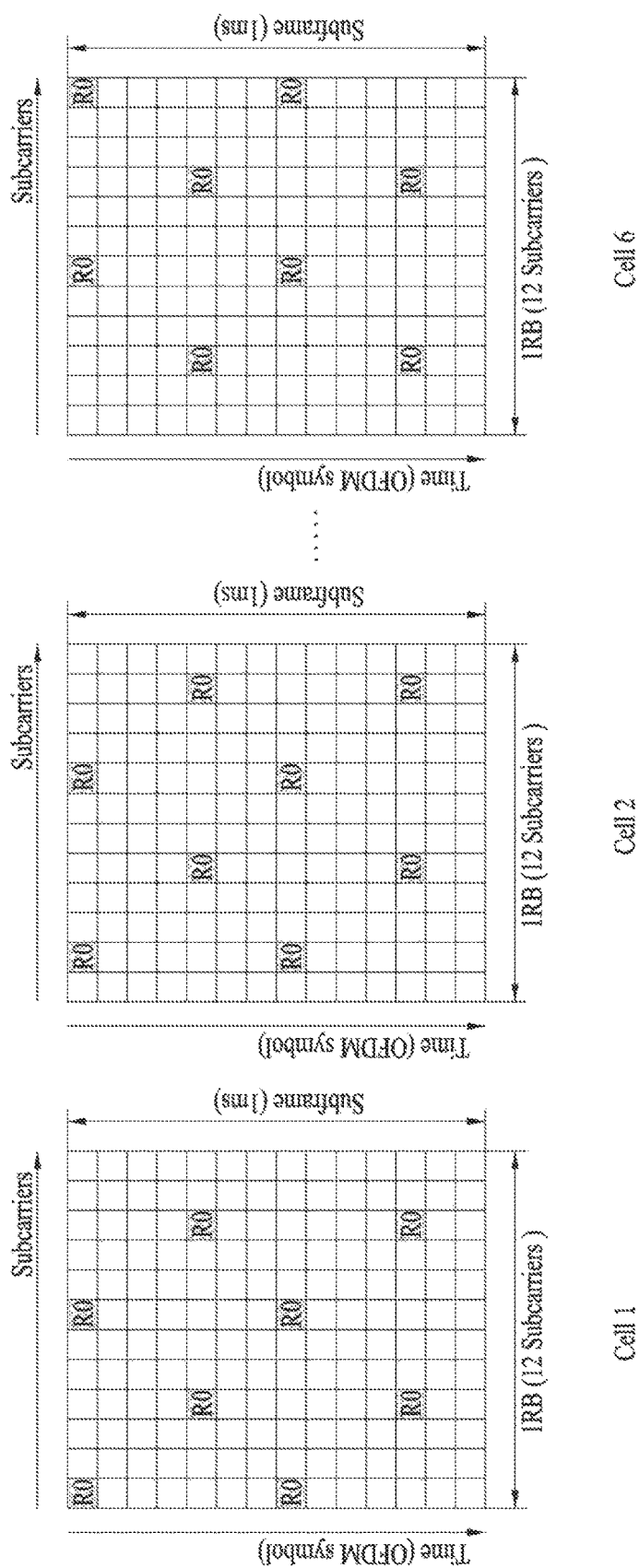
FIG. 6 is a diagram illustrating shift of a reference signal pattern.

FIG. 6 shows that a reference signal pattern is shifted in each cell to prevent reference signals of various cells from colliding with each other. Assuming that a reference signal pattern for one antenna port shown in FIG. 5(a) is used by a cell #1 (Cell 1) shown in FIG. 6, in order to prevent collision of reference signals between cells including a cell #2 adjacent to the cell #1, a cell #3 adjacent to the cell #1 and the like, it is able to protect a reference signal in a manner of shifting a reference signal pattern by subcarrier or OFDM symbol unit in frequency or time domain. For instance, in case of 1 Tx antenna transmission, since a reference signal is situated in 6-subcarrier interval on a single OFDM symbol, if a shift by subcarrier unit in frequency domain is applied to each cell, at least 5 adjacent cells may be able to situate reference signals on different resource elements, respectively. For instance, a frequency shift of a reference signal may be represented as the cell #2 and the cell #6 in FIG. 6.

Moreover, by multiplying a downlink reference signal per cell by a pseudo-random (PN) sequence and then transmitting the multiplied signal, interference caused to a receiver by a reference signal received from an adjacent cell can be reduced to enhance channel estimation performance. This PN sequence may be applicable by OFDM symbol unit in a single subframe. Regarding the PN sequence, a different sequence may be applicable per cell ID, subframe number or OFDM symbol position.

In a system [e.g., 8-Tx antenna supportive wireless communication system (e.g., 3GPP LTE Release-10 system, a systems according to 3GPP LTE Releases next to Release-10, etc.)] having antenna configuration more extended than a legacy 4-Tx antenna supportive communication system (e.g., 3GPP LTE Release-8 system, 3GPP LTE Release-9 system, etc.), DMRS based data demodulation is taken into consideration to support efficient management & operation and developed transmission scheme of reference signals. In particular, in order to support data transmission via extended antennas, it may be able to define DMRS for at least two layers. Since DMRS is precoded by the same precoder of data, it is easy for a receiving side to estimate channel information for demodulating data without separate precoding information. Meanwhile, a downlink receiving side is able to acquire channel information precoded for the extended antenna configuration through DMRS. Yet, a separate reference signal other than the DMRS is requested to acquire non-precoded channel information. Hence, in a system by LTE-A standards, a reference signal (i.e., CSI-RS) for a receiving side to acquire channel state information (CSI) can be defined. In particular, CSI-RS may be transmitted via 8 antenna ports. In order to discriminate a CSI-RS transmitted antenna port from an antenna port of 3GPP LTE Release-8/9, it may be able to use antenna port indexes 15 to 22.

Configuration of Downlink Control Channel

As a region for transmitting a downlink control channel, first three OFDM symbols of each subframe are available. In particular, 1 to 3 OFDM symbols are available in accordance with overhead of the downlink control channel. In order to adjust the number of OFDM symbols for a downlink control channel in each subframe, it may be able to use PCFICH. And, it is able to use PHICH to provide an acknowledgment response [ACK/NACK (acknowledgement/negative-acknowledgement)] to an uplink transmission in downlink. Moreover, it is able to use PDCCH to transmit control information for a downlink or uplink data transmission.

Figure 7:
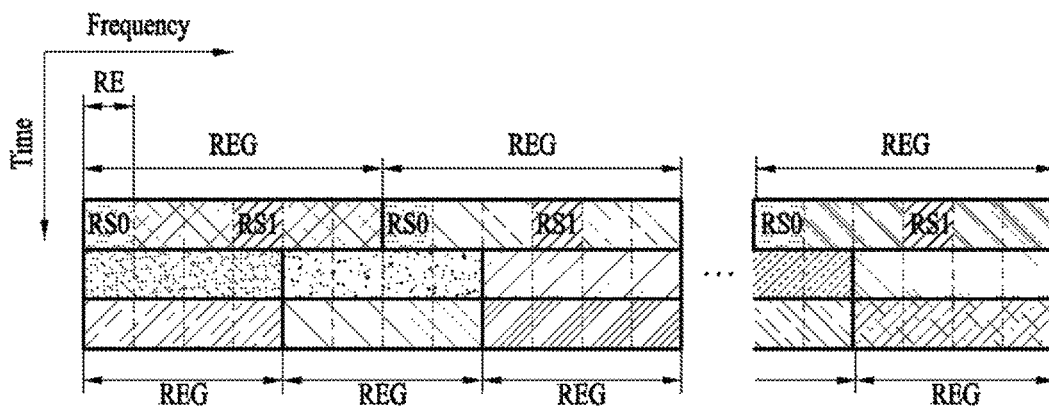
FIG. 7 and FIG. 8 are diagrams illustrating a resource element group (REG) unit to which downlink control channels are assigned.
Figure 8:
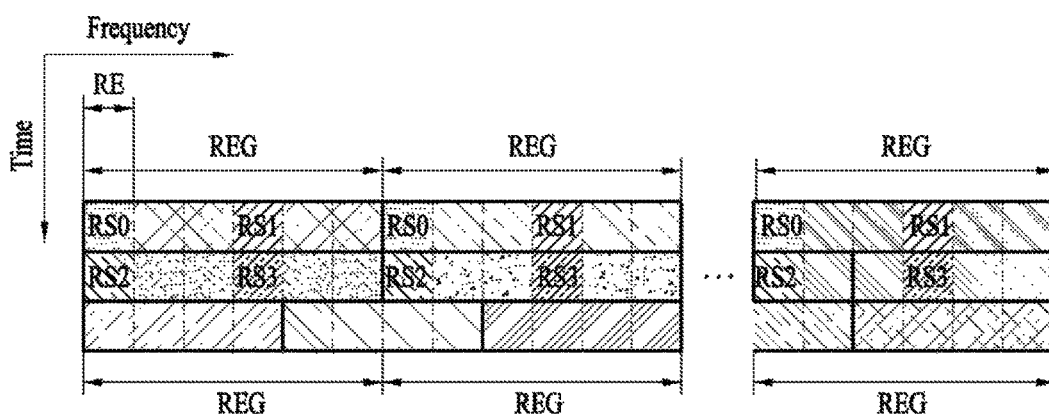

FIG. 7 and FIG. 8 show that the above-configured downlink control channels are assigned by resource element group (REG) unit in a control region of each subframe. FIG. 7 relates to a system having 1- or 2-Tx antenna configuration and FIG. 8 relates to a system having 4-Tx antenna configuration. Referring to FIG. 7 and FIG. 8, REG corresponding to a basic resource unit for assigning a control channel is configured with 4 contiguous Res in frequency domain except a resource element for assigning a reference signal. A specific number of REGs are available for a transmission of a downlink control channel in accordance with overhead of the downlink control channel.

PCFICH (Physical Control Format Indicator Channel)

In order to provide every subframe with resource allocation information of the corresponding subframe and the like, it is able to transmit PDCCH between OFDM symbol indexes 0 to 2. In accordance with overhead of a control channel, it may be able to use the OFDM symbol index 0, the OFDM symbol indexes 0 and 1, or the OFDM symbol indexes 0 to 2. Thus, the number of OPFDM symbols used for a control channel is changeable for each subframe. And, information on the OFDM symbol number may be provided via PCFICH. Hence, the PCFICH should be transmitted in every subframe.

Three kinds of informations can be provided through the PCFICH. Table 1 in the following shows CFI (control format indicator) of PCFICH. 'CFI=1' indicates that PDCCH is transmitted on OFDM symbol index 0, 'CFI=2' indicates that PDCCH is transmitted on OFDM symbol indexes 0 and 1, and 'CFI=3' indicates that PDCCH is transmitted on OFDM symbol indexes 0 to 2.

[Table 1]

Information carried on PCFICH may be defined different in accordance with a system bandwidth. For instance, in case that a bandwidth of a system is smaller than a specific threshold, 'CFI=1' may indicate that 2 OFDM symbols are used for PDCCH. 'CFI=2' may indicate that 3 OFDM symbols are used for PDCCH. And, 'CFI=3' may indicate that 4 OFDM symbols are used for PDCCH.

Figure 9:
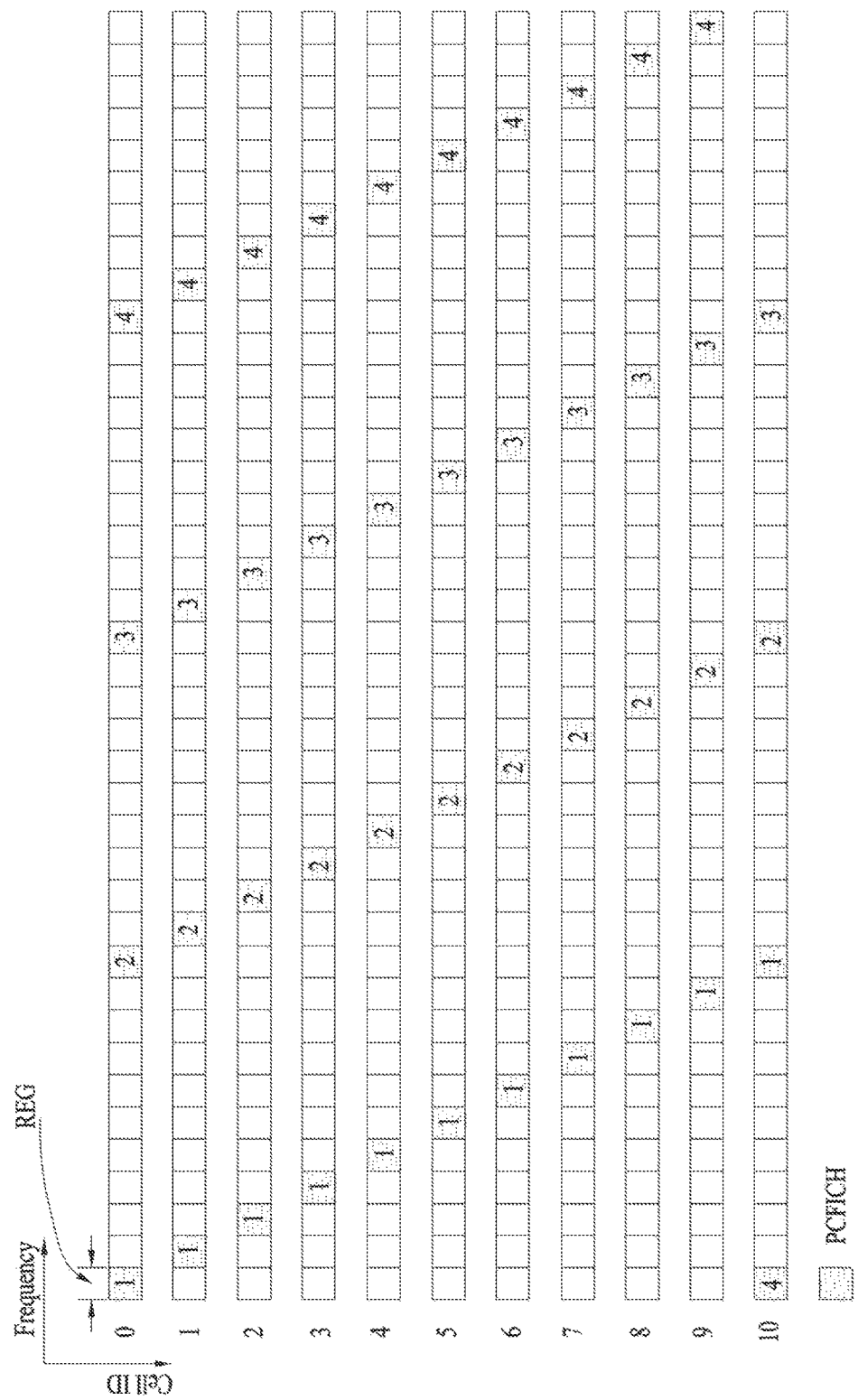
FIG. 9 is a diagram illustrating a scheme of transmitting a PCIFCH.

FIG. 9 is a diagram for a scheme of transmitting PCIFCH. REG shown in FIG. 9 is configured with 4 subcarriers, and more particularly, with data subcarriers except RS (reference signal). Generally, a transmit diversity scheme may apply thereto. A position of the REG may be frequency-shifted per cell (i.e., in accordance with a cell identifier) not to cause interference between cells. Additionally, PCFICH is always transmitted on a 1st OFDM symbol (i.e., OFDM symbol index 0) of a subframe. Hence, when a receiving end receives a subframe, the receiving end acquires the number of OFDM symbols for carrying PDCCH by checking information of PCFICH and is then able to receive control information transmitted on the PDCCH.

PHICH (Physical Hybrid-ARQ Indicator Channel)

Figure 10:
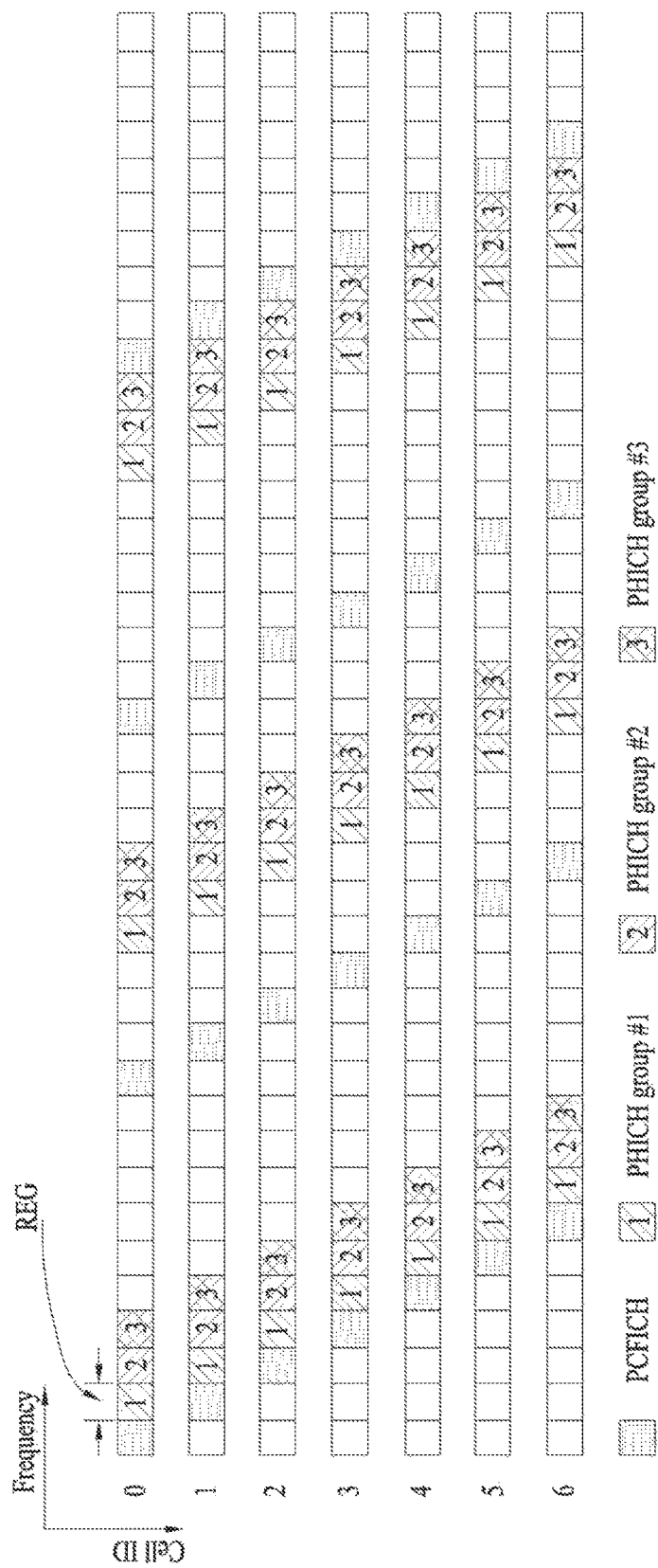
FIG. 10 is a diagram illustrating positions of a PCFICH and a PHICH.

FIG. 10 is a diagram to illustrate positions of PCFICH and PHICH generally applied for a specific bandwidth. ACK/NACK information on an uplink data transmission is transmitted on PHICH. Several PHICH groups are created in a single subframe and several PHICHs exist in a single PHICH group. Hence, PHICH channels for several user equipments are included in the single PHICH group.

Referring to FIG. 10, PHICH assignment for each user equipment in several PHICH groups are performed using a lowest PRB (physical resource block) index of PUSCH resource allocation and a cyclic shift index for a demodulation reference signal (DMRS) transmitted on a UL (uplink) grant PDCCH. In this case, the DMRS is a UL reference signal and is the signal provided together with a UL transmission for channel estimation for demodulation of UL data. Moreover, PHICH resource is known through such an index pair as $(n_{PHICH}^{group}, n_{PHICH}^{seq})$. In $(n_{PHICH}^{group}, n_{PHICH}^{seq})$, $n_{PHICH}^{group}$ means a PHICH group number) and $n_{PHICH}^{seq}$ means an orthogonal sequence index in the corresponding PHICH group. $n_{PHICH}^{group}$ and $n_{PHICH}^{seq}$ is defined as Formula 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad \text{[Formula 1]}$$

In Formula 1, $n_{DMRS}$ indicates a cyclic shift of DMRS used for a PHICH associated UL transmission. And, $N_{SF}^{PHICH}$ indicates a spreading factor size used for PHICH. $I_{PRB\_RA}^{lowest\_index}$ indicates a lowest PRB index of a UL resource allocation. $N_{PHICH}^{group}$ indicates the number of the configured PHICH groups and may be defined as Formula 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g$ indicates an amount of PHICH resource transmitted on PBCH (Physical Broadcast Channel) and $N_g$ is represented as $N_g \in \{1/6, 1/2, 1, 2\}$ in 2-bit size.

One example of an orthogonal sequence defined by the legacy 3GPP LTE Release-8/9 is shown in Table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 11:
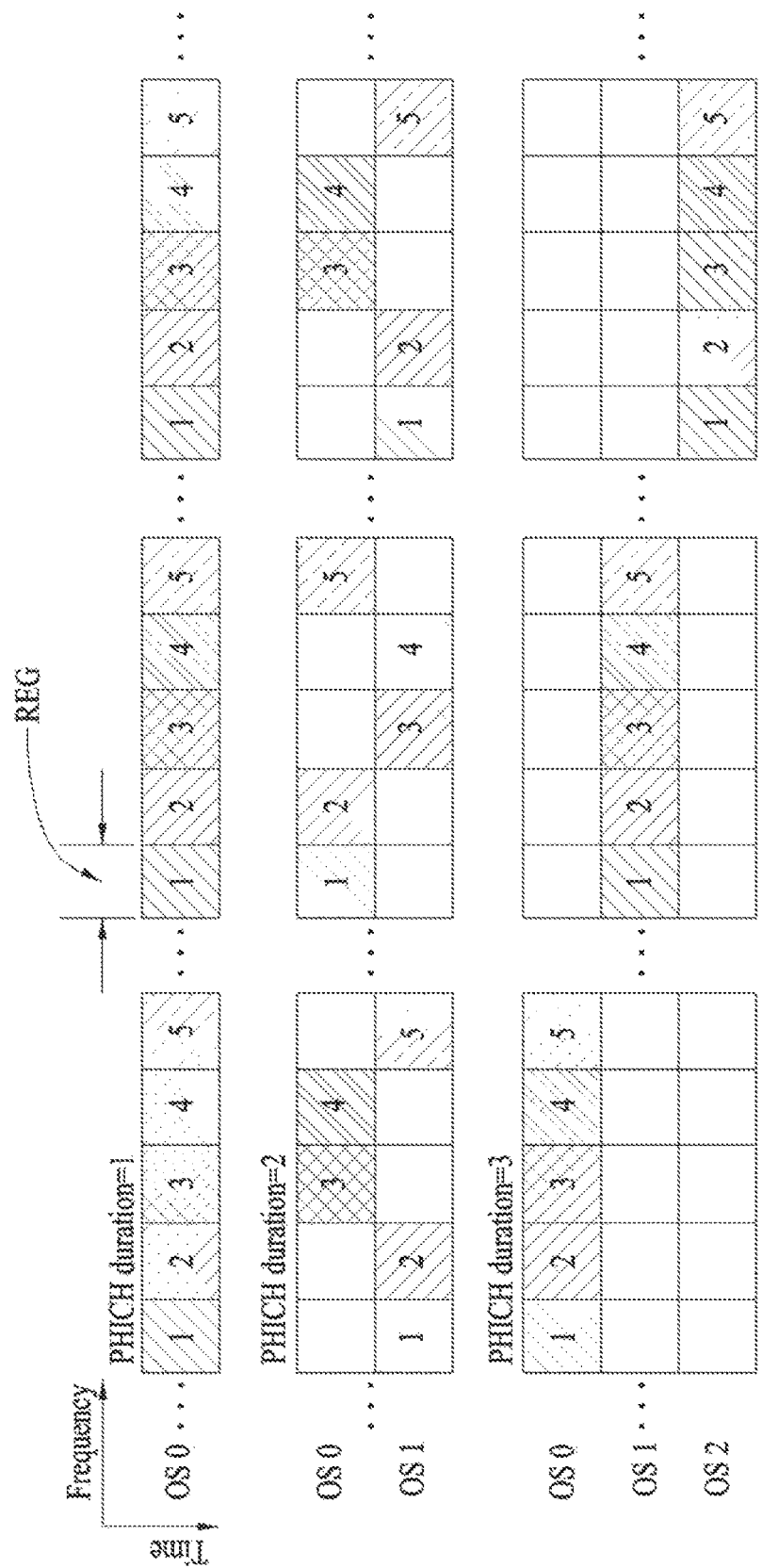
FIG. 11 is a diagram illustrating a position of a DL resource element having a PHICH group mapped thereto.

FIG. 11 is a diagram to illustrate a position of a downlink (DL) resource element having PHICH group mapped thereto. Referring to FIG. 11, PHICH group may be configured in different time region (i.e., a different OS (OFDM symbol)) within a single subframe.

PDCCH (Physical Downlink Control Channel)

Control information transmitted on PDCCH may have control information size and usage differing in accordance with a DCI (downlink control information) format. And, a size of the PDCCH may vary in accordance with a coding rate. For instance, DCI formats used by the legacy 3GPP LTE Release-8/9 may be defined as Table 3.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2bit power adjustments |
| 3A | TPC commands for PUCCH and PUSCH with single bit power adjustments |

The DCI format shown in Table 3 is independently applied per user equipment and PDCCHs of several user equipments can be simultaneously multiplexed within a single subframe. The multiplexed PDCCH of each of the user equipments is independently channel-coded and CRC is applied thereto. The CRC of the PDCCH is masked with a unique identifier of each of the user equipments and can be applied to enable the corresponding user equipment to receive the PDCCH of its own. Yet, since a user equipment is basically unable to know a position of its PDCCH channel, the user equipment checks whether each of the entire PDCCH channels of the corresponding DCI format matches the PDCCH channel having the ID of the corresponding user equipment for each subframe and needs to perform blind detection until receiving the corresponding PDCCH. A basic resource allocation unit of the PDCCH is CCE (control channel element) and a single CCE is configured with 9 TEGs. A single PDCCH may be configured with 1, 2, 4 or 8 CCEs. PDCCH configured in accordance with each user equipment is interleaved into a control channel region of each subframe and then mapped by a CCE-to-RE mapping rule. This may vary an RE position having a CCE mapped thereto in accordance with the OFDM symbol number for a control channel of each subframe, the PHICH group number, Tx antennas, a frequency shift and the like.

Uplink Retransmission

Uplink (UL) retransmission may be indicated via the aforementioned PHICH and the DCI format 0 (i.e., DCI format for scheduling PUSCH transmission). A user equipment receives ACK/NACK for a previous UL transmission via PHICH and is then able to perform a synchronous non-adaptive retransmission. Alternatively, a user equipment receives a UL grant via DCI format 0 PDCCH from a base station and is then able to perform a synchronous adaptive retransmission.

The synchronous transmission means that a retransmission is performed at a predetermined timing point (e.g., (n+k)th subframe) after a timing point (e.g., nth subframe) of transmitting a data packet. In both cases of the retransmission by PHICH and the retransmission by UL grant PDCCH, the synchronous retransmission is performed.

Regarding the non-adaptive retransmission of performing a retransmission on PHICH, the same frequency resource and transmitting method of the former frequency resource (e.g., physical resource block (PRB) region) and transmitting method (e.g., modulation scheme, etc.) used for a previous transmission are applied to the retransmission. Meanwhile, regarding the adaptive retransmission of performing a retransmission via UL grant PDCCH, a frequency resource and transmitting method for performing a retransmission may be set different from those of a previous transmission in accordance with a scheduling control information indicated by a UL grant.

In case that a user equipment receives a UL grant PDCCH as soon as receives PHICH, the user equipment may be able to perform a UL transmission in accordance with control information of the UL grant PDCCH by ignoring the PHICH. Since a new data indicator (NDI) is included in the UL grant PDCCH (e.g., DCI format 0), if NDI bit is toggled more than a previously provided NDI value, the user equipment regards a previous transmission as successful and is then able to transmit new data. Meanwhile, although the user equipment receives ACK for a previous transmission via PHICH, unless the NDI value is toggled in the UL grant PDCCH received simultaneously with or after the PHICH reception, the user equipment is configured not to flush a buffer for the previous transmission.

Uplink Transmission Configuration

Figure 12:
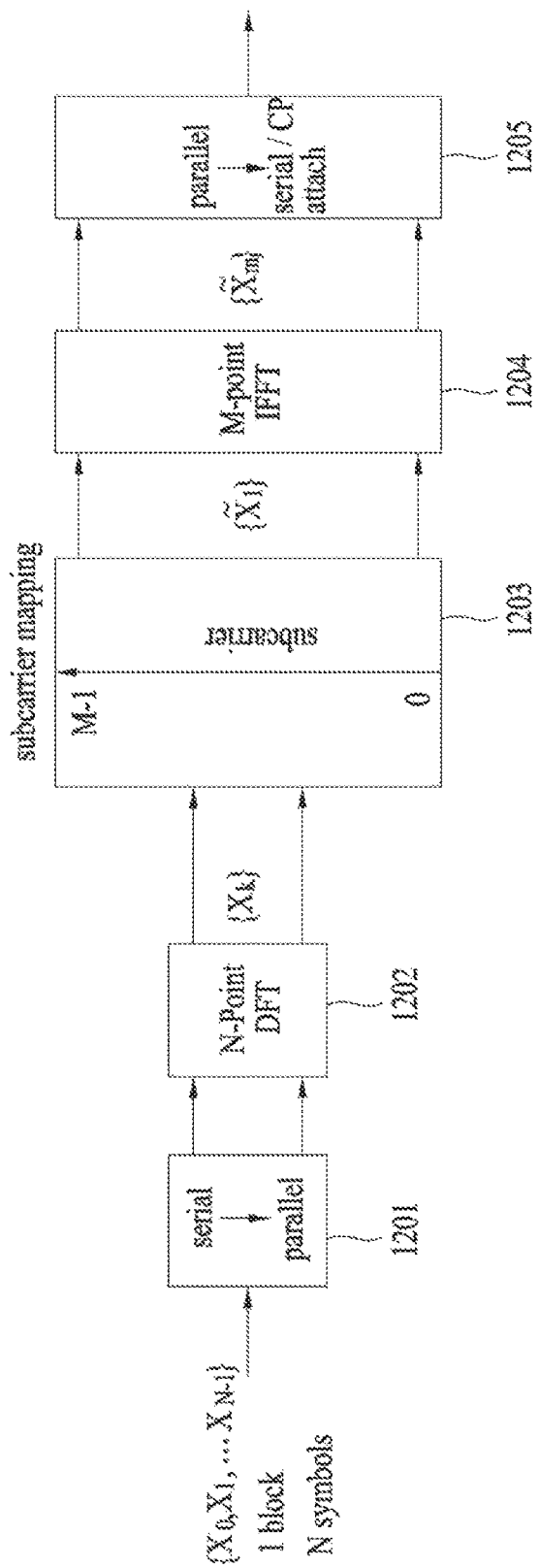
FIG. 12 is a diagram illustrating a structure of a transmitter by SC-FDMA.

FIG. 12 is a diagram for a structure of a transmitter by SC-FDMA.

First of all, a single block configured with N symbols inputted to a transmitter is converted to a parallel signal via a serial-to-parallel converter 1201. The parallel signal spreads via an N-point DFT module 1202. The spreading signal is mapped to a frequency region via a subcarrier mapping module 1203. Signals on subcarriers configure linear combination of N symbols. The signal mapped to the frequency region is transformed into a time-domain signal via an M-point IFFT module 1204. The time-domain signal is converted to a parallel signal via a parallel-to-serial converter 1205 and then has a CP added thereto. The effect of the IFFT processing by the M-point IFFT module 1204 is cancelled out by the DFT processing of the N-point DFT module 1202 to some extent. In this point, the SC-FDMA may be named DFT-s-OFDMA (DFT-spread-OFDMA). Moreover, although the signal inputted to the DFT module 1202 has a low PAPR (peak-to-average power ratio) or CM (cubic metric), it may have a high PAPR after DFT processing. And, the signal outputted by the IFFT processing of the IFFT module 1204 may have a low PAPR again. In particular, according to the SC-FDMA, transmission is performed by avoiding a non-linear distortion interval of a power amplifier (PA), whereby a cost for implementation of a transmitting end can be reduced.

FIG. 13 is a diagram to describe a scheme of mapping a signal outputted from the DFT module 1202 to a frequency region. By performing one of the two schemes shown in FIG. 13, a signal outputted from an SC-FDMA transmitter can meet the single carrier property. FIG. 13 (a) shows a localized mapping scheme of locally mapping signals outputted from the DFT module 1202 to a specific part of a subcarrier region. FIG. 13(b) shows a distributed mapping scheme of mapping signals outputted from the DFT module 1202 to a whole subcarrier region by being distributed. In the legacy 3GPP LTE Release-8/9 system, it is defined that the localized mapping scheme is used.

Figure 14:
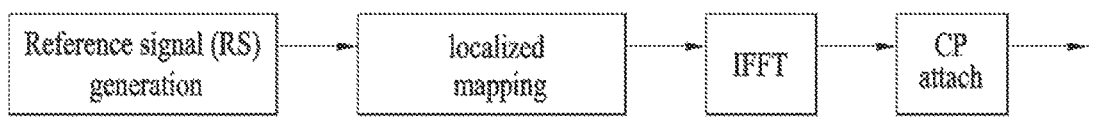
FIG. 14 is a block diagram illustrating transmission processing of a reference signal.

FIG. 14 is a block diagram to describe a transmission processing of a reference signal to demodulate a transmitted signal by SC-FDMA. In the legacy 3GPP LTE Release-8/9 system, a data part is transmitted in a manner of transforming a signal generated from a time domain into a frequency-domain signal by DFT processing, performing subcarrier mapping on the frequency-domain signal, and then performing IFFT processing on the mapped signal [cf. FIG. 12]. Yet, a reference signal (RS) is defined as directly generated in frequency domain without DFT processing, mapped to subcarrier, undergoing IFFT processing, and then having CP addition thereto.

FIG. 15 is a diagram to illustrate a symbol position having a reference signal (RS) mapped thereto in a subframe structure according to SC-FDMA. FIG. 15(a) shows that RS is located at 4th SC-FDMA symbol of each of 2 slots in a single subframe in case of a normal CP. FIG. 15(b) shows that RS is located at 3rd SC-FDMA symbol of each of 2 slots in a single subframe in case of an extended CP.

Clustered DFT-s-OFDMA scheme is described with reference to FIGS. 16 to 19 as follows. The clustered DFT-s-OFDMA is the modification of the aforementioned SC-FDMA. According to the clustered DFT-s-OFDMA, a DFT-processed signal is segmented into a plurality of sub-blocks and then mapped to a spaced position in frequency domain.

Figure 16:
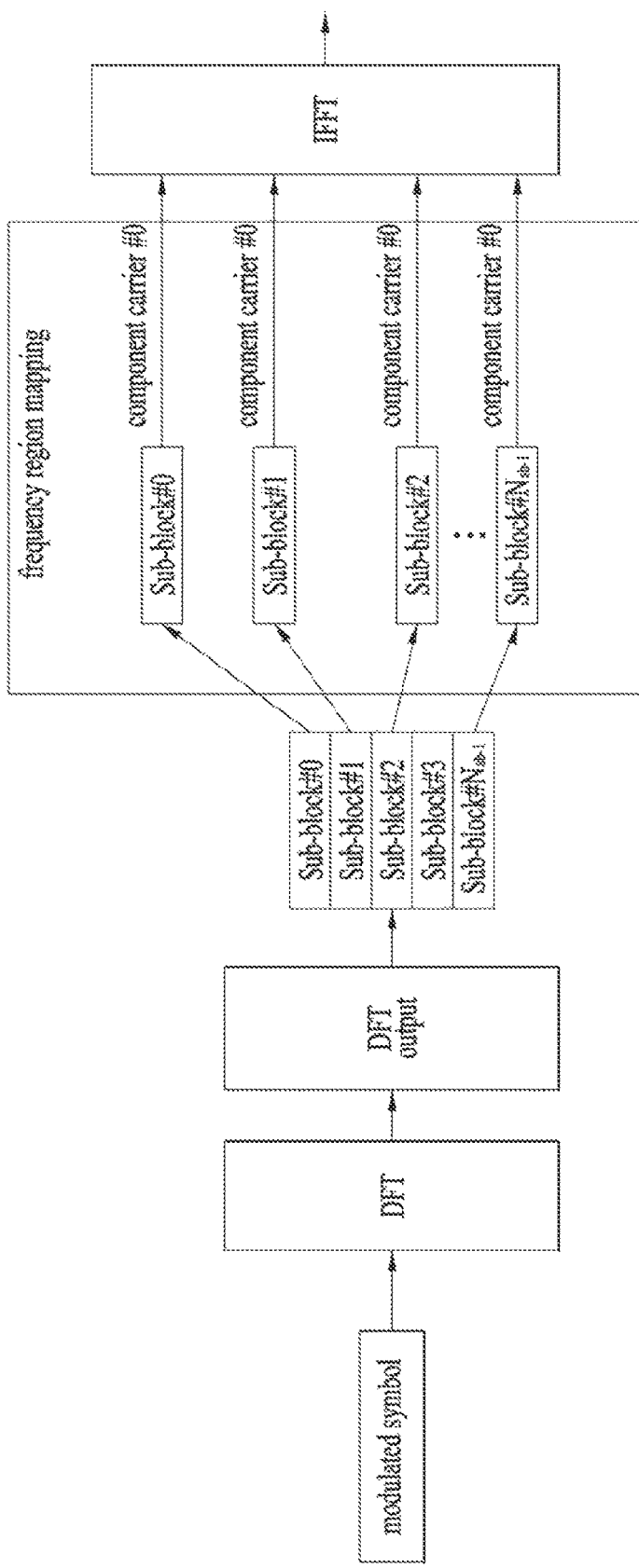
FIG. 16 to FIG. 19 are diagrams illustrating a clustered DFT-s-OFDMA scheme.

FIG. 16 is a diagram to describe a clustered DFT-s-OFDMA scheme on a single carrier. For instance, a DFT output may be partitioned into Nsb sub-blocks (sub-blocks #0 to #Nsb-1). When sub-blocks are mapped to a frequency region, the sub-blocks #0 to #NSb-1 are mapped to a single carrier (e.g., carrier of 20 MHz bandwidth, etc.) and each of the sub-blocks may be mapped to a position spaced in the frequency region. And, each of the sub-blocks may be locally mapped to the frequency region.

Figure 17:
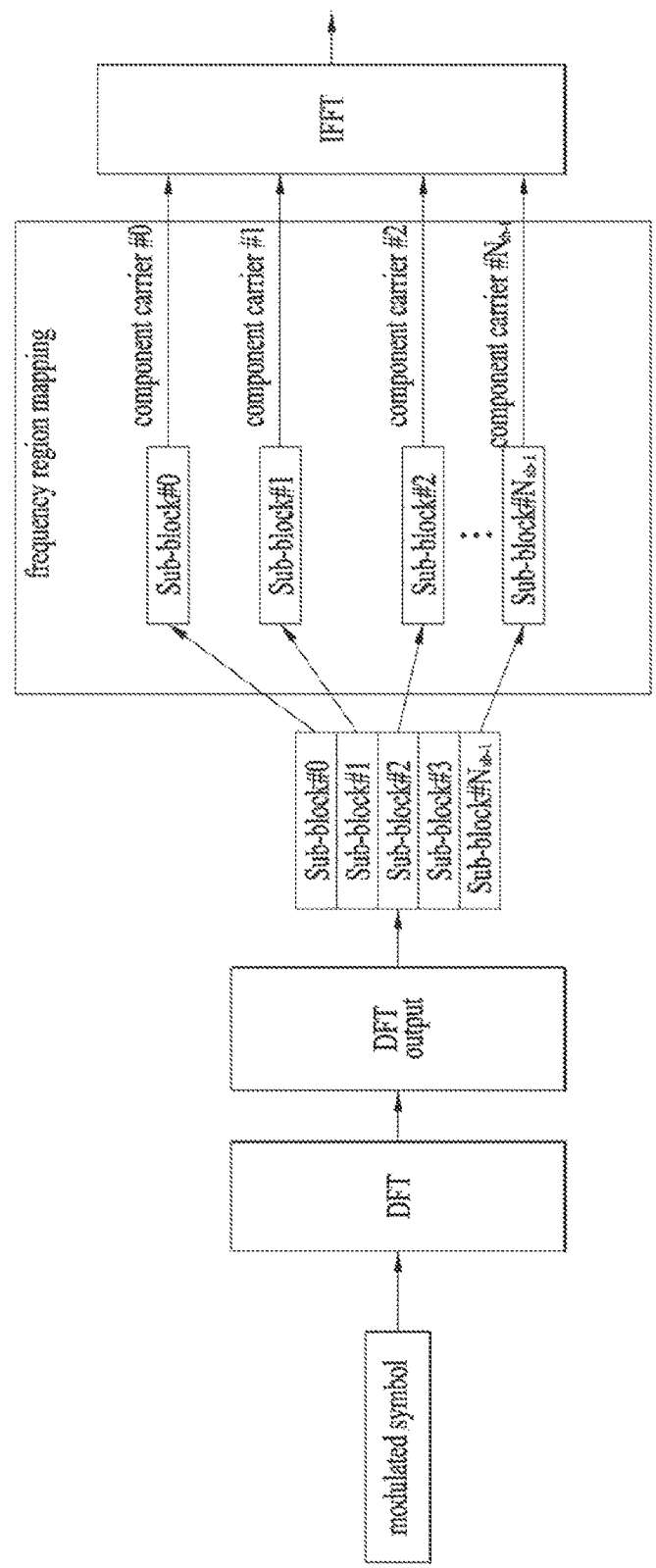
Figure 18:
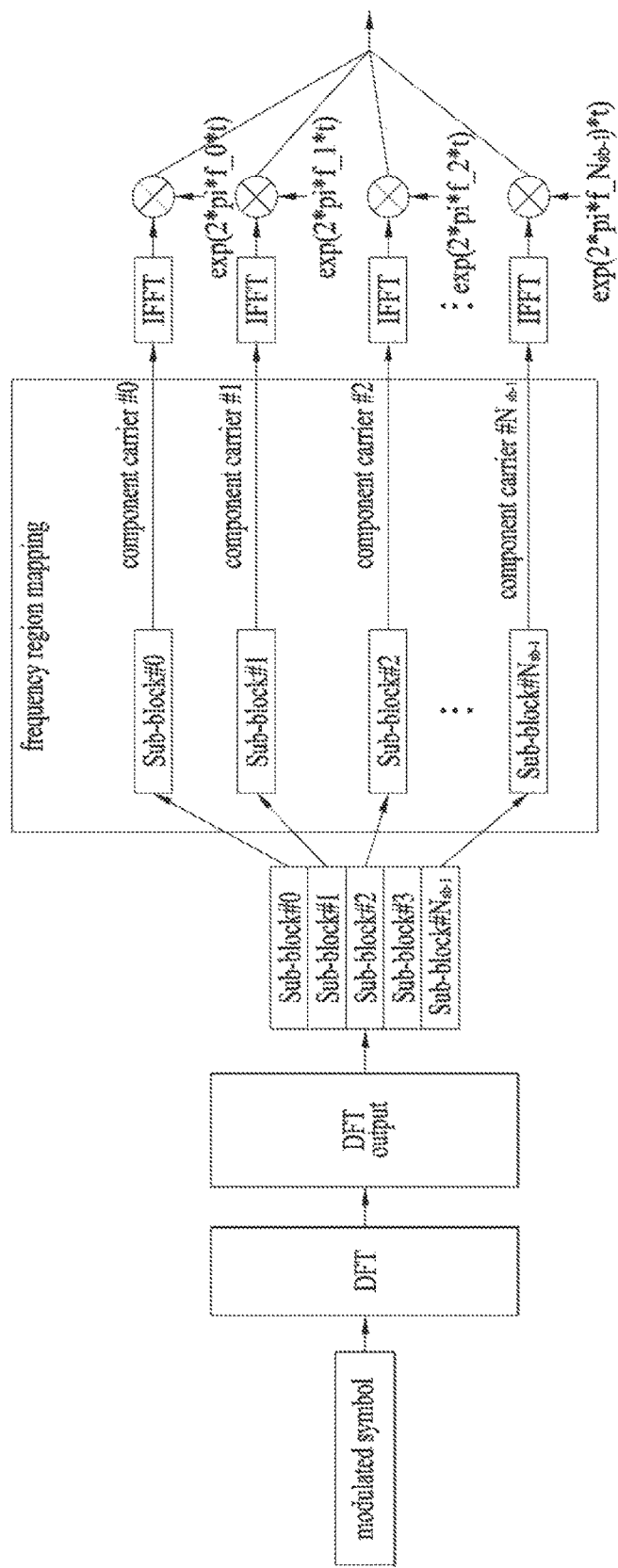

FIG. 17 and FIG. 18 are diagrams to describe a clustered DFT-s-OFDMA scheme on multiple carriers.

In a situation (i.e., frequency bands of multiple carriers (cells) are contiguously assigned) that multiple carriers (or multiple cells) are configured contiguously, if a subcarrier interval between contiguous carriers is aligned, FIG. 17 is a diagram for one example that a signal can be generated through a single IFFT module. For instance, a DFT output may be segmented into Nsb sub-blocks (sub-blocks #0 to #NSb-1). In mapping sub-blocks to a frequency region, the sub-blocks #0 to #NSb-1 can be mapped to component carriers #0 to #NSb-1, respectively [e.g., each carrier (or cell) may have a bandwidth of 20 MHz]. moreover, each of the sub-blocks may be mapped to a frequency region by being localized. And, the sub-blocks mapped to the carriers (or cells) may be transformed into a time-domain signal through a single IFFT module.

In a situation (i.e., frequency bands of multiple carriers (cells) are non-contiguously assigned) that multiple carriers (or multiple cells) are configured non-contiguously, FIG. 18 is a diagram for one example that a signal is generated using a plurality of IFFT modules. For instance, a DFT output may be segmented into Nsb sub-blocks (sub-blocks #0 to #NSb-1). In mapping sub-blocks to a frequency region, the sub-blocks #0 to #NSb-1 can be mapped to carriers #0 to #NSb-1, respectively [e.g., each carrier (or cell) may have a bandwidth of 20 MHz]. moreover, each of the sub-blocks may be mapped to a frequency region by being localized. And, the sub-blocks mapped to the carriers (or cells) may be transformed into a time-domain signal through the IFFT modules, respectively.

If the clustered DFT-s-OFDMA on the single carrier mentioned with reference to FIG. 16 is called intra-carrier (or intra-cell) DFT-s-OFDMA, the DFT-s-OFDMA on the multiple carriers (or cells) mentioned with reference to FIG. 17 or FIG. 18 may be called inter-carrier (or inter-cell) DFT-s-OFDMA. Thus, the intra-carrier DFT-s-OFDMA and the inter-carrier DFT-s-OFDMA may be interchangeably usable.

Figure 19:
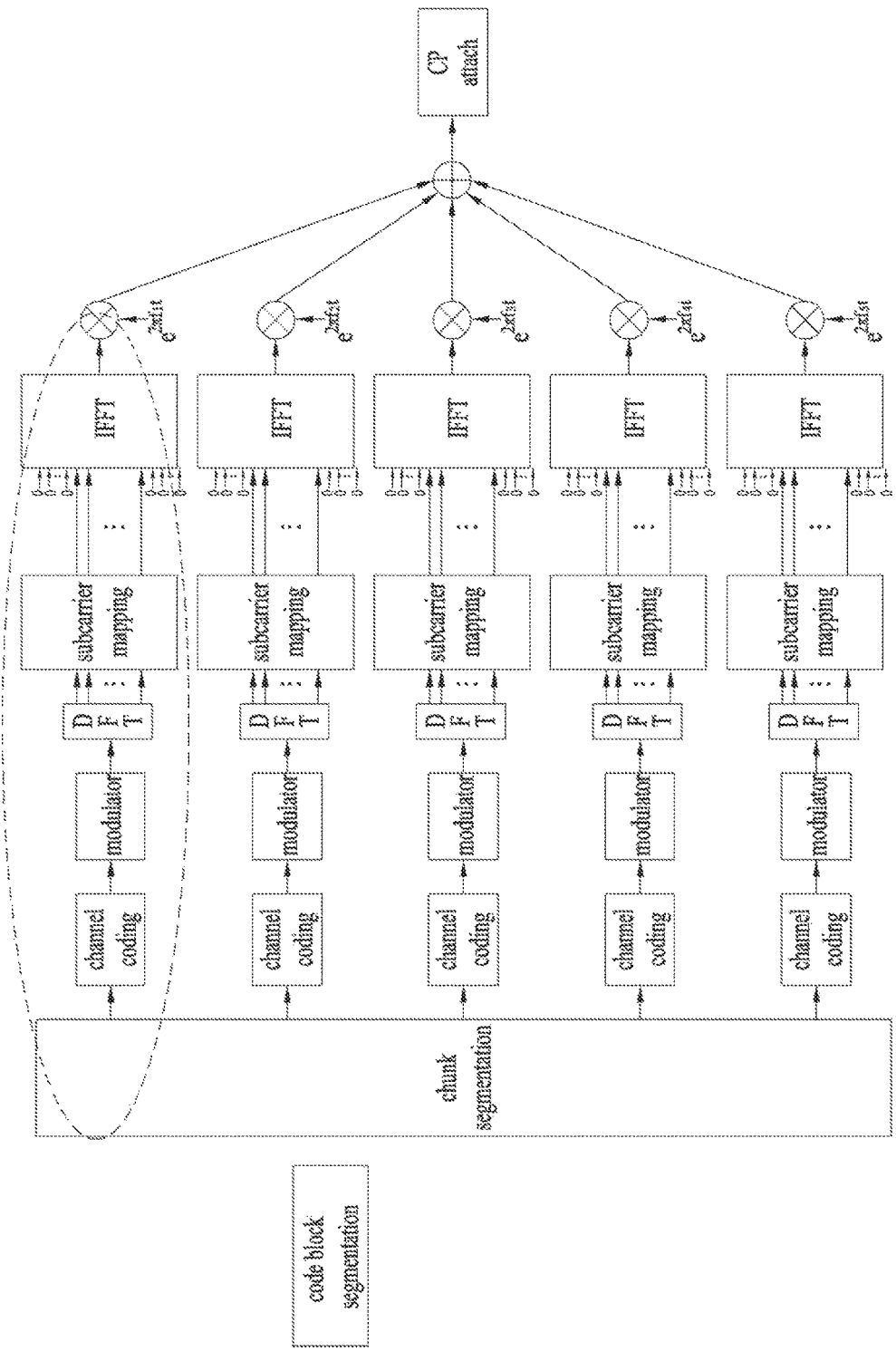

FIG. 19 is a diagram to describe a chuck-specific DFT-s-OFDMA scheme of performing DFT processing, frequency domain mapping and IFFT processing by chunk unit. The chunk-specific DFT-s-OFDMA may be called Nx SC-FDMA. A code block segmented signal is chunk-segmented into parts and channel coding and modulation is performed on each of the parts. The modulated signal undergoes the DFT processing, the frequency domain mapping and the IFFT processing in the same manner described with reference to FIG. 12, outputs from the respective IFFTs are added up, and CP may be added thereto. The Nx SC-FDMA scheme mentioned with reference to FIG. 19 may be applicable to a contiguous multi-carrier (or multi-cell) case and a non-contiguous multi-carrier (or multi-cell) case both.

Structure of MIMO System

Figure 20:
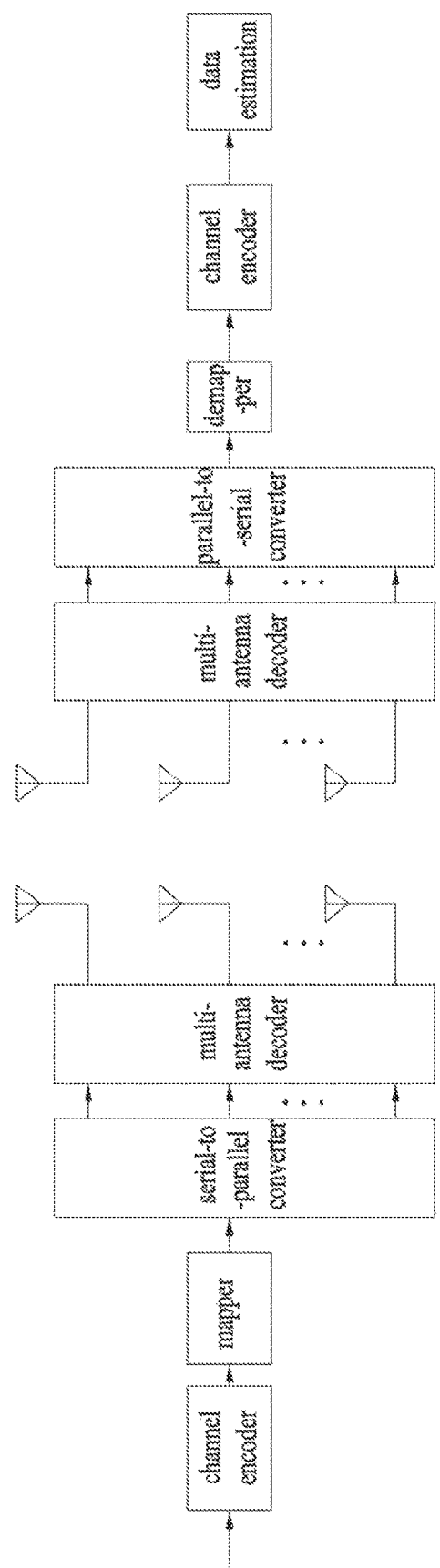
FIG. 20 is a diagram illustrating a structure of a MIMO system.

FIG. 20 is a diagram to illustrate a basic structure of MIMO system having multiple Tx antennas and/or multiple Rx (receiving) antennas. Each block shown in FIG. 20 conceptionally indicates a function or operation in a transmitting/receiving end for MIMO transmission.

A channel encoder shown in FIG. 20 indicates an operation of attaching a redundancy bit to an input data bit, whereby effect of noise and the like from a channel can be reduced. A mapper indicates an operation of converting data bit information to data symbol information. A serial-to-parallel converter indicates an operation of converting serial data to parallel data. A multi-antenna encoder indicates an operation of transforming a data symbol into a time-spatial signal. A multi-antenna of a transmitting end plays a role in transmitting this time-spatial signal on a channel, while a multi-antenna of a receiving end plays a role in receiving the signal on the channel.

A multi-antenna decoder shown in FIG. 20 indicates an operation of transforming the received time-spatial signal into each data symbol. A parallel-to-serial converter indicates an operation of converting a parallel signal to a serial signal. A demapper indicates an operation of transforming a data symbol to a bit information. A decoding operation for a channel code is performed by a channel decoder, whereby data can be estimated.

The MIMO transceiving system mentioned in the above description may have a single or several codewords spatially in accordance with a space multiplexing ratio. A case of having a single codeword spatially is called a single codeword (SCW) structure. And, a case of having several codewords is called a multiple codeword (MCW) structure.

Figure 21:
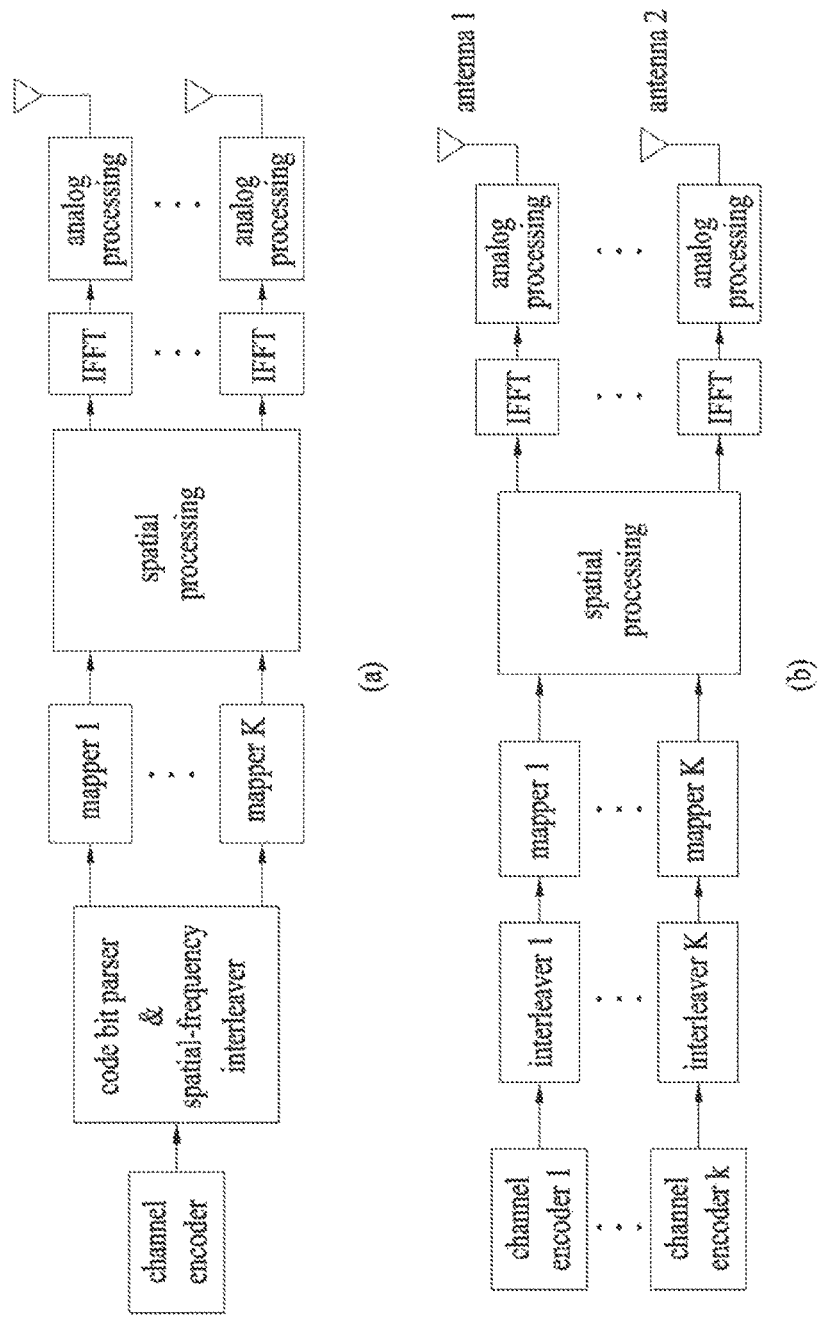
FIG. 21 is a block diagram illustrating functionality of a MIMO system.

FIG. 21(a) is a block diagram to represent functionality of a transmitting end of an MIMO system having the SCW structure. And, FIG. 21(b) is a block diagram to represent functionality of a transmitting end of an MIMO system having the MCW structure.

Codebook Based Precoding Scheme

In order to support multi-antenna transmission, it may be able to apply precoding of appropriately distributing transmission information to each antenna in accordance with a channel status and the like. A codebook based precoding scheme means the scheme performed in a following manner. First of all, a set of precoding matrixes is determined in a transmitting end and a receiving end. Secondly, the transmitting end measures channel information from the transmitting end and then feeds back information (i.e., a precoding matrix index (PMI)) indicating what is a most appropriate precoding matrix to the transmitting end. Finally, the transmitting end applies an appropriate precoding to a signal transmission based on the PMI. Since the appropriate precoding matrix is selected from the previously determined precoding matrix set, although an optimal precoding is not always applied, this is more advantageous than the explicit feedback of optimal precoding information actually carried on channel information in reducing feedback overhead.

Figure 22:
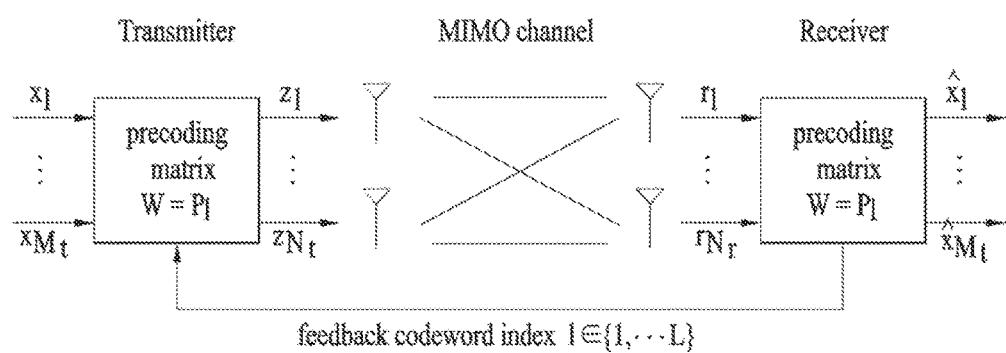
FIG. 22 is a diagram illustrating a basic concept of codebook based precoding.

FIG. 22 is a diagram to describe basic concept of codebook based precoding.

According to a codebook based precoding scheme, a transmitting and a receiving end share codebook information including a prescribed number of precoding matrixes in accordance with a transmission rank, the number of antennas and the like. In particular, in case that feedback information is finite, it is able to use the precoding based codebook scheme. The receiving end measures a channel status via a received signal and is then able to deed back information (i.e., indexes of the corresponding precoding matrixes) on the finite number of preferred precoding matrixes based on the above-mentioned codebook information to the transmitting end. For instance, the receiving end is able to select an optimal precoding matrix in a manner of measuring a received signal by ML (maximum likelihood) or MMSE (minimum mean square error) scheme. FIG. 22 shows that the receiving end transmits the precoding matrix information per codeword to the transmitting end, by which the present invention may be non-limited.

Having received the feedback information from the receiving end, the transmitting end may be able to select a specific precoding matrix from the codebook based on the received information. Having selected the precoding matrix, the transmitting end performs a precoding in a manner of multiplying layer signals, of which number corresponds to the transmission rank, by the selected precoding matrix and may be then able to transmit a precoded transmission signal via a plurality of antennas. In the precoding matrix, the number of rows is equal to that of the antennas and the number of columns is equal to a rank value. Since the rank value is equal to the number of the layers, the number of the columns is equal to the number of layers. For instance, if the number of the Tx antennas and the number of the transmission layers are 4 and 2, respectively, the precoding matrix can be configured with 4×2 matrix. Information transmitted via each layer can be mapped to each antenna via the precoding matrix.

Having received the signal precoded and transmitted by the transmitting end, the receiving end is able to reconstruct the received signal by performing a processing inverse to that of the precoding performed by the transmitting end. Generally, since the precoding matrix meets such a unitary matrix (U) condition as U*UH=I, the inverse processing of the precoding may be performed in a manner of multiplying the received signal by Hermit matrix (PH) of the precoding matrix (P) used for the precoding of the transmitting end.

For instance, Table 4 in the following indicates a codebook used for a downlink transmission using 2 Tx antennas in 3GPP LTE Release-8/9 and Table 5 indicates a codebook used for a downlink transmission using 4 Tx antennas in 3GPP LTE Release-8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/\sqrt{2}$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/\sqrt{2}$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/\sqrt{2}$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/\sqrt{2}$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/\sqrt{2}$ |

TABLE 5-continued

| Codebook index | $u_n$ | Number of layers $\upsilon$ | | | |
|---|---|---|---|---|---|
| | | 1 | 2 | 3 | 4 |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/\sqrt{2}$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/\sqrt{2}$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/\sqrt{2}$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/\sqrt{2}$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/\sqrt{2}$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/\sqrt{2}$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/\sqrt{2}$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/\sqrt{2}$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/\sqrt{2}$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/\sqrt{2}$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/\sqrt{2}$ |

In Table 5, $W_n^{\{s\}}$ is obtained from a set $\{S\}$ configured from a formula expressed as $W_n = 1 - 2u_n u_n^H / u_n^H u_n$. In this case, I indicates 4×4 unitary matrix and $u_n$ indicates a value given by Table 5.

Referring to Table 4, when a codebook for 2 Tx antennas has total 7 precoding vectors/matrixes, since a unitary matrix is provided for an open-loop system, there are total 6 precoding vectors/matrixes for the precoding of a closed-loop system. Moreover, referring to Table 5, a codebook for 4 Tx antennas has total 64 precoding vectors/matrixes.

The above-mentioned codebooks have such a common property as a constant modulus (CM) property, a nested property, a constrained alphabet property and the like. According to the CM property, each element of every precoding matrix within a codebook does not contain '0' and is configured to have the same size. According to the nested property, a precoding matrix of a low rank is designed to be configured with a subset of a specific column of a precoding matrix of a high rank. According to the constrained alphabet property, each element of every precoding matrix within a codebook is constrained. For instance, each element of a precoding matrix is limited only to an element (±1) used for BPSH (binary phase shift keying), elements (±1, ±j) used for QPSK (quadrature phase shift keying), or elements $$\left(\pm 1, \pm j, \pm \frac{(1+j)}{\sqrt{2}}, \pm \frac{(-1+j)}{\sqrt{2}}\right)$$

used for 8-PSK. In the example of the codebook shown in Table 5, since alphabet of each element of every precoding matrix within the codebook is configured with $$\left\{\pm 1, \pm j, \pm \frac{(1+j)}{\sqrt{2}}, \pm \frac{(-1+j)}{\sqrt{2}}\right\},$$

it may be represented as having the constrained alphabet property.

Feedback Channel Structure

Basically, since a base station is unable to know information on a DL channel in FDD system, channel information fed back by a user equipment is used for a DL transmission. In case of the legacy 3GPP LTE Release-8/9 system, it is able to feed back DL channel information via PUCCH or PUSCH. In case of the PUCCH, channel information is periodically fed back. In case of the PUSCH, channel information is aperiodically fed back in accordance with a request made by a base station. Moreover, feedback of channel information may be performed in a manner of feeding back the channel information on a whole frequency band (i.e., wideband (WB)) or the channel information on a specific number of RBs (i.e., subband (SB)).

Extended Antenna Configuration

Figure 23:
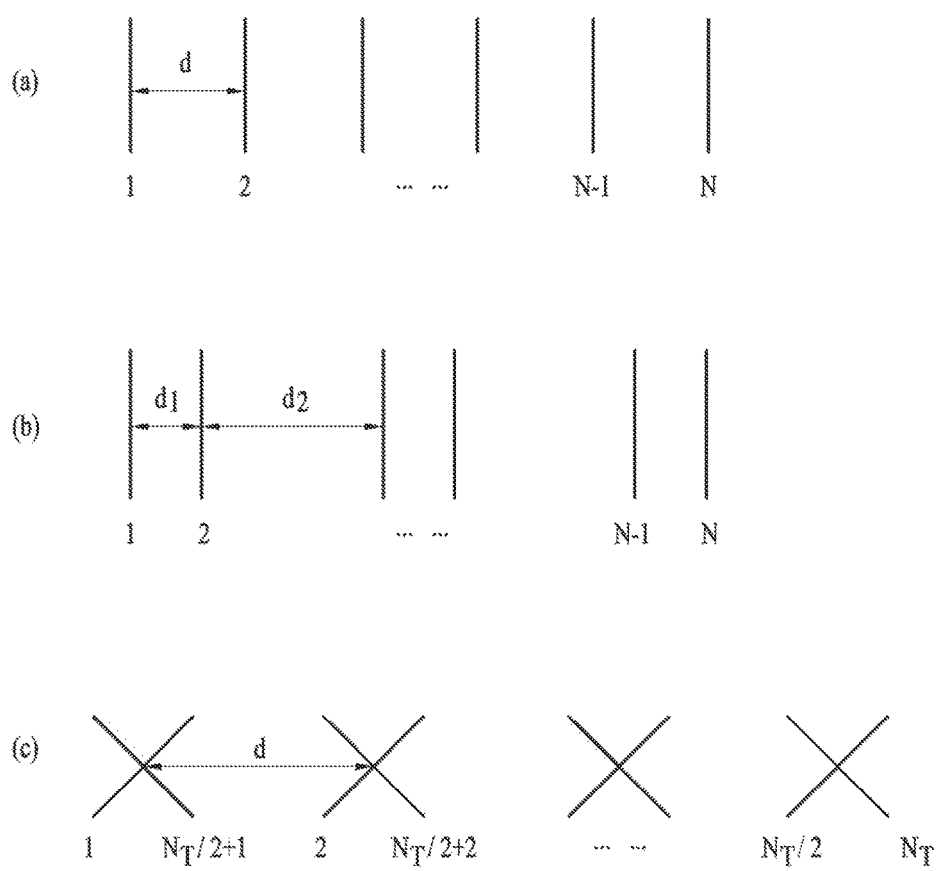
FIG. 23 is a diagram illustrating examples of configuration of 8 Tx (transmitting) antennas.

FIG. 23 shows examples of configuration of 8 Tx (transmitting) antennas.

FIG. 23(a) shows a case that N antennas configure independent channels without being grouped, which is generally called ULA (uniform linear array). In case that the number of antennas is small, the ULA configuration may be available. In case that the number of antennas is big, multiple antennas are arranged in a manner being spaced apart from each other. Hence, it may be insufficient for a space of a transmitter and/or receiver to configure independent channels.

FIG. 23(b) shows an antenna configuration (i.e., paired ULA) of ULA type in which 2 antennas form a pair. In this case, an associated channel is established between a pair of the antennas and may be independent from that of antennas of another pair.

Meanwhile, unlike the fact that the legacy 3GPP LTE Release-8/9 system uses 4 Tx antennas in DL, the 3GPP LTE Release-10 system is able to use 8 Tx antennas in DL. In order to apply this extended antenna configuration, it is necessary to install several Tx antennas in insufficient space. Thus, the ULA antenna configuration shown FIG. 23(a) or FIG. 23(b) may become inappropriate. Therefore, it may be able to consider applying a dual-polarized (or cross-polarized) antenna configuration shown in FIG. 23(c). In case of this configuration of Tx antennas, even if a distance between antennas is relatively short, it is able to configure independent channels by lowering correlation. Therefore, data transmission of high throughput can be achieved.

Codebook Structures

If a transmitting end and a receiving end share a pre-defined codebook with each other, it is able to lower an overhead for the receiving end to feed back precoding information to be used for MIMO transmission from the transmitting end. Hence, it is able to apply efficient precoding.

For one example of configuring a pre-defined codebook, it is able to configure a precoder matrix using DFT (discrete Fourier transform) matrix or Walsh matrix. Alternatively, it is able to configure precoders of various types by combination with a phase shift matrix, a shift diversity matrix or the like.

In configuring a DFT matrix based codebook, n×n DFT matrix can be defined as Formula 3.

$$DFTn: D_n(k, \ell) = \frac{1}{\sqrt{n}} \exp(-j2\pi k\ell/n), \quad \text{[Formula 3]}$$

$$k, \ell = 0, 1, \ldots, n-1$$

In the DFT matrix of Formula 3, a single matrix exists for a specific size n only. Hence, in order to appropriately define and use various kinds of precoding matrixes in accordance with a situation, it may be able to consider configuring to use a rotated version of the DFTn matrix in addition. One example of the rotated DFTn matrix is shown in Formula 4.

$$\text{rotated } DFTn: D_n^{(G,g)}(k, \ell) = \frac{1}{\sqrt{n}} \exp(-j2\pi k(\ell + g/G)/n), \quad \text{[Formula 4]}$$

$$k, \ell = 0, 1, \ldots, n-1,$$

$$g = 0, 1, \ldots, G.$$

In case that the DFT matrix shown in Formula 4 is configured, it is able to create G rotated DFTn matrixes. And, the created matrixes may meet the property of the DFT matrix.

In the following description, a householder-based codebook structure is explained. The householder-based codebook structure may mean the codebook configured with householder matrix. In particular, the householder matrix is the matrix used for householder transform. The householder transform is a sort of linear transformation and may be usable in performing QR decomposition. The QR decomposition may mean that a prescribed matrix is decomposed into an orthogonal matrix (Q) and an upper triangular matrix (R). The upper triangular matrix means a square matrix of which components below main diagonal components are all zeros. One example of the 4×4 householder matrix is shown in Formula 5.

$$M_t = I_4 - 2u_0 u_t^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad \text{[Formula 5]}$$

$$u_0^T = [1 \; -1 \; -1 \; -1]$$

It is able to create 4×4 unitary matrix having the CM property by householder transformation. Like the codebook for the 4 Tx antennas shown in Table 5, n×n precoding matrix is created using the householder transformation and a column subset of the created precoding matrix can be configured to be used as a precoding matrix for a transmission of a rank smaller than n.

Multi-Codebook Based Precoder Creation

A precoding operation used for a multi-antenna transmission may be explained as an operation of mapping a signal transmitted via layer(s) to antenna(s). In particular, by X×Y precoding matrix, Y transmission layers (or streams) can be mapped to X Tx antennas.

In order to configure Nt×R precoding matrix used in transmitting R streams (i.e., Rank R) via Nt Tx antennas, a transmitting end receives a feedback of at least one precoding matrix index (PMI) from a receiving end and is then able to configure a precoder matrix. Formula 6 shows one example of a codebook configured with nc matrixes.

$$P_{N_t \times R}(k) \in \{P_1^{N_t \times R}, P_2^{N_t \times R}, P_3^{n_t \times R}, \ldots, P_{n_c}^{N_t \times R}\} \quad \text{[Formula 6]}$$

In Formula 6, k indicates a specific resource index (e.g., a subcarrier index, a virtual resource index, a subband index, etc.). Formula 6 may be configured in form of Formula 7.

$$P_{N_t \times R}(k) = \begin{bmatrix} P_{M_t \times R, 1} \\ P_{M_t \times R, 2} \end{bmatrix}, \quad \text{[Formula 7]}$$

$$N_t = 2 \cdot M_t$$

In Formula 7, $P_{M_t \times R, 2}$ may be configured in form of shifting $P_{M_t \times R, 1}$ by a specific complex weight $w_2$. Hence, if a difference between $P_{M_t \times R, 1}$ and $P_{M_t \times R, 2}$ is represented as a specific complex weight, it may be expressed as Formula 8.

$$P_{N_t \times R}(k) = \begin{bmatrix} w_1 \cdot P_{M_t \times R, 1} \\ w_2 \cdot P_{M_t \times R, 1} \end{bmatrix} \quad \text{[Formula 8]}$$

Moreover, Formula 8 may be represented as Formula 9 using Kroneker product (⊗).

$$P_{N_t \times R, n, m}(k) = \begin{bmatrix} w_1 \\ w_2 \end{bmatrix} \otimes P_{M_t \times R, 1} = W_n \otimes P \quad \text{[Formula 9]}$$

Kroneker product is an operation for 2 matrixes in random size. As a result of Kroneker product operation, it is able to obtain a block matrix. For instance, Kroneker product of an m×n matrix A and a p×q matrix B (i.e., A⊗B) may be represented as Formula 10. In Formula 10, amn indicates an element of the matrix A and bpq indicates an element of the matrix B.

[Formula 10]

$$A \otimes B =$$

$$\begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{21} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & & \vdots & \ddots & & \vdots & \vdots & & \vdots \\ \vdots & \vdots & & \vdots & & \ddots & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}$$

A partial matrix $$\begin{bmatrix} w_1 \\ w_2 \end{bmatrix}$$

of precoding and $P_{M_t \times R, 1}$ in Formula 9 may be independently fed back from a receiving end. And, a transmitting end is able to configure and use a precoder like Formula 8 or Formula 9 using each feedback information. In case of applying the form of Formula 8 or Formula 9, W is always configured in form of 2×1 vector and may be configured in form of a codebook shown I Formula 11.

$$W \in \begin{bmatrix} 1 \\ e^{j\frac{2\pi}{N}i} \end{bmatrix}, \quad [\text{Formula 11}]$$
$$i = 0, \ldots, N-1$$

In Formula 11, N indicates the total number of precoding vectors contained in the codebook and i may be used as an index of a vector. In order to obtain proper performance by minimizing feedback overhead, i may be usable by being set to 2, 4 or 8. Moreover, $P_{M_t \times R,1}$ may be configured as a codebook for 4 Tx antennas or a codebook for 2 Tx antennas. For this, the codebook of Table 4 or Table 5 (e.g., the codebook for 2 or 4 Tx antennas defined in 3GPP LTE Release-8/9) is usable. And, $P_{M_t \times R,1}$ may be configured in rotated DFT form as well.

Moreover, a matrix W may be available in form of 2×2 matrix. Formula 12 shows one example of the 2×2 matrix W.

$$P_{N_t \times 2R,n,m}(k) = \begin{bmatrix} w_1 & w_3 \\ w_2 & w_4 \end{bmatrix} \otimes P_{M_t \times R,1} = W_n \otimes P_m, \quad [\text{Formula 12}]$$
$$N_t = 2 \cdot M_t$$

In case of the configuration of Formula 12, if a maximum rank of the codebook $P_{M_t \times R,1}$ is R, it may be able to design a codebook of a rank up to 2R. For instance, in case of using the codebook shown in Table 4 as $P_{M_t \times R,1}$, according to Formula 9, it may be usable up to 4 (R=4) as a maximum rank. On the other hand, according to Formula 12, it may be able to use a maximum rank up to 8 (2R=8). Hence, in the system configured with 8 Tx antennas, it is able to configure a precoder capable of 8×8 transmission. In this case, W may be configured in form of a codebook shown in Formula 13.

$$W \in \begin{bmatrix} 1 & 1 \\ e^{j\frac{2\pi}{N}i} & -e^{j\frac{2\pi}{N}i} \end{bmatrix}, \quad [\text{Formula 13}]$$
$$i = 0, \ldots, N-1$$

The precoder configuring method according to Formula 9 or Formula 12 may apply differently in accordance with each rank. For instance, the method of Formula 9 is used for a case of a rank equal to or lower than 4 (R≤4). And, the method of Formula 12 may be used for a case of a rank equal to or higher than 5 (R≥5). Alternatively, the method of Formula 9 is used only for a case of a rank 1 (R=1). In other cases (i.e., rank 2 or higher (R≥2)), it may be able to use the method of Formula 12. The W and P mentioned in association with Formula 9 and Formula 12 may be fed back to have the property as shown in Table 6.

TABLE 6

| Case | W/P |
|---|---|
| Frequency granularity 1 | One of two matrixes may be configured to be fed back on subband and the other may be configured to be fed back on wideband. |
| Frequency granularity 2 | One of two matrixes may be configured to be fed back on nest-M band and the other may be configured to be fed back on wideband. |
| Time granularity | One of two matrixes may be configured to be fed back by periods N and the other may be configured to be fed back by periods M. |
| Feedback channel 1 | One of two matrixes may be configured to be fed back on PUSCH and the other may be configured to be fed back on PUCCH. |
| Feedback channel 2 | In case of feedback on PUSCH, one (e.g., W) of two matrixes may be configured to be fed back on subband and the other (e.g., P) may be configured to be fed back on wideband. In case of feedback on PUCCH, both Q and P may be configured to be fed back on wideband. |
| Unequal protection | One (e.g., P) of two matrixes may be configured to be coded at a more reliable rating rate and the other (e.g., W) may be configured to be coded at a relatively low coding rate. |
| Alphabet restriction 1 | Alphabet of a matrix W may be configured to be constrained by BPSK and alphabet of a matrix P may be configured to be constrained by QPSK or 8 PSK. |
| Alphabet restriction 2 | Alphabet of a matrix W may be configured to be constrained by QPSK and alphabet of a matrix P may be configured to be constrained by QPSK or 8 PSK. |

In the following description, a multi-codebook based precoder having the nested property is explained.

First of all, it is able to configure a codebook using the method of Formula 9 and the method of Formula 12 appropriately. Yet, in some cases, it may be impossible to configure a precoder unless using two kinds of combinations. To solve this problem, it may be able to configure and use a precoder as shown in Formula 14.

$$P_{N_t \times N_t, n, m} = \begin{bmatrix} w_1 & w_3 \\ w_2 & w_4 \end{bmatrix} \otimes P_{M_t \times M_t} = W_n \otimes P_m, \quad [\text{Formula 14}]$$
$$N_t = 2 \cdot M_t$$

A precoder for a case that a rank value is equal to the number of Tx antennas (R=Nt) is configured using the $P_{N_t \times N_t}$ obtained from Formula 14 and a column subset of the configured precoder may be usable as a precoder for a lower rank. If the precoder is configured in the above manner, the nested property can be met to simplify the CQI calculation. In Formula 14, $P_{N_t \times N_t, n, m}$ indicates the precoder in case of R=Nt. In this case, for example, a subset configured with 0th and 2nd columns of $P_{N_t \times N_t, n, m}$ may be usable for a precoder for R=2, which can be represented as $P_{N_t \times N_t, n, m}(0,2)$. In this case, $P_{M_t \times M_t}$ may be configured with a rotated DFT matrix or a codebook of another type.

Meanwhile, in order to raise a diversity gain in an open-loop environment, based on the precoder configured in the above manner, it is able to maximize the beam diversity gain by exchanging to use a precoder in accordance with a specific resource. For instance, in case of using the precoder according to the method of Formula 9, a method of applying a precoder in accordance with a specific resource may be represented as Formula 15.

$$P_{N_t \times R, n, m}(k) = w_{k \bmod n_c} \otimes P_{k \bmod m_c} \quad [\text{Formula 15}]$$

In Formula 15, k indicates a specific resource region. A precoding matrix for a specific resource region k is determined by such a modulo operation as Formula 15. In this case, $n_c$ and $m_c$ may indicate a size or subset of a codebook for matrix W and a size or subset of a codebook for a matrix P, respectively.

Like Formula 15, if cycling is applied to each of the two matrixes, complexity may increase despite maximizing a diversity gain. Hence, long-term cycling may be set to be applied to a specific matrix and short-term cycling may be set to be applied to the rest of the matrixes.

For instance, the matrix W may be configured to perform a modulo operation in accordance with a physical resource block (PRB) index and the matrix P may be configured to perform a modulo operation in accordance with a subframe index. Alternatively, the matrix W may be configured to perform a modulo operation in accordance with a subframe index and the matrix P may be configured to perform a modulo operation in accordance with a physical resource block (PRB) index.

For another instance, the matrix W may be configured to perform a modulo operation in accordance with a physical resource block (PRB) index and the matrix P may be configured to perform a modulo operation in accordance with a subband index. Alternatively, the matrix W may be configured to perform a modulo operation in accordance with a subband index and the matrix P may be configured to perform a modulo operation in accordance with a physical resource block (PRB) index.

Moreover, a precoder cycling using a modulo operation is applied to one of the two matrixes only and the other may be fixed to use.

Codebook Configuration for 8 Tx Antennas

In the 3GPP LTE Release-10 system having an extended antenna configuration (e.g., 8 Tx antennas), the feedback scheme used by the legacy 3GPP LTE Release-8/9 may be applied in a manner of being extended. For instance, it is able to feed back such channel state information (CSI) as RI (Rank Indicator), PMI (Precoding Matrix Index), CQI (Channel Quality Information) and the like. In the following description, a method of designing a dual precoder based feedback codebook usable for a system supportive of an extended antenna configuration is explained. In the dual precoder based feedback codebook, in order to indicate a precoder to be used for MIMO transmission of a transmitting end, a receiving end may be able to transmit a precoding matrix index (PMI) to the transmitting end. In doing so, a precoding matrix may be indicated by combination of 2 different PMIs. In particular, the receiving end feeds back 2 different PMIs (i.e., 1st PMI and 2nd PMI) to the transmitting end. Subsequently, the transmitting end determines the precoding matrix indicated by the combination of the 1st and 2nd PMIs and is then able to apply the determined precoding matrix to the MIMO transmission.

IN designing the dual precoder based feedback codebook, it may be able to consider 8-Tx antenna MIMO transmission, single user-MIMO (SU-MIMO) and multiple user-MIMO (MU-MIMO) supports, compatibility with various antenna configurations, codebook design references, codebook size and the like.

As a codebook applicable to 8-Tx antenna MIMO transmission, it may be able to consider designing a feedback codebook. In particular, this feedback codebook supports SU-MIMO only in case of a rank higher than 2, is optimized for both SU-MIMO and MU-MIMO in case of a rank equal to or lower than 2, and is compatible with various antenna configurations.

In case of MU-MIMO, user equipments participating in MU-MIMO are preferably separated in correlation domain. Hence, the codebook for MU-MIMO needs to be designed to correctly operate on a channel having high correlation. Since DFT vectors provide good performance on a channel having high correlation, it may be able to consider having DFT vector contained in a codebook set of a rank up to a rank-2. In high scattering propagation environment (e.g., an indoor environment having many reflective waves, etc.) capable of producing many space channels, SU-MIMO operation may be preferred as the MIMO transmission scheme. Hence, it may be able to consider designing a codebook for a rank higher than the rank-2 to have god performance in separating multiple layers.

In designing a precoder for MIMO transmission, it is preferable that one precoder structure has good performance for various antenna configurations (e.g., low-correlation, high-correlation, cross-pole, etc.). In arrangement of 8 Tx antennas, a cross-polarized array having an antenna interval of 4λ may be formed in a low-correlation antenna configuration, a ULA having an antenna interval of 0.5λ may be formed in a high-correlation antenna configuration, or a cross-polarized array having an antenna interval of 0.5λ may be formed in a cross-polarized antenna configuration. The DFT based codebook structure may be able to provide good performance for the high-correlation antenna configuration. Meanwhile, block diagonal matrixes may be more suitable for the cross-polarized antenna configuration. Hence, in case that a diagonal matrix is introduced into a codebook for 8 Tx antennas, it is able to configure a codebook that provides god performance for all antenna configurations.

As mentioned in the foregoing description, the codebook design reference is to meet the unitary codebook, the CM property, the constrained alphabet, the proper codebook size, the nested property and the like. This applies to the 3GPP LTE Release-8/9 codebook design. And, it may be able to consider applying such a codebook design reference to the 3GPP LTE Release-10 codebook design supportive of the extended antenna configuration.

Regarding the codebook size, it is necessary to increase the codebook size to sufficiently support the advantage in using 8 Tx antennas. In order to obtain a sufficient precoding gain from 8 Tx antennas in environment with low correlation, a codebook in large size (e.g., a codebook in size over 4 bits for Rank 1 or Rank 2) may be required. In order to obtain a precoding gain in an environment with high correlation, a codebook in 4-bit size may be sufficient. Yet, in order to achieve a multiplexing gain of MU-MIMO, it may be able to increase a codebook size for Rank 1 or Rank 2.

Based on the above description, general structures of a codebook for 8 Tx antennas are explained as follows.

Codebook Structure (1)

In applying multi-granular feedback, a method of configuring a codebook for 8 Tx antennas by combination of 2 base matrixes and a method of configuring the combination of 2 base matrixes using an inner product are described as follows.

First of all, a method of using an inner product of 2 base matrixes may be represented as Formula 16.

$$W = \tilde{W}_1 \tilde{W}_2 \qquad \text{[Formula 16]}$$

In case that codebook for 8 Tx antennas is represented in form of an inner product, a 1st base matrix may be represented as a diagonal matrix shown in Formula 17 for a co-polarized antenna group.

$$\tilde{W}_1 = \begin{bmatrix} W_1 & 0 \\ 0 & W_1 \end{bmatrix} (W_1 : 4 \times N) \qquad \text{[Formula 17]}$$

Moreover, in case that a 2nd base matrix is used to adjust a relative phase between polarizations, the 2nd base matrix may be represented using an identity matrix. For an upper rank of a codebook for 8 Tx antennas, the 2nd base matrix may be represented as Formula 18. In Formula 18, a relation between a coefficient '1' of a 1st row of the 2nd base matrix and a coefficient 'a' or '−a' of a 2nd row thereof may be able to reflect the adjustment of a relative phase between orthogonal polarizations.

$$\tilde{W}_2 = \begin{bmatrix} I & I \\ aI & -aI \end{bmatrix} (I:N \times N) \quad \text{[Formula 18]}$$

Hence, if the codebook for 8 Tx antennas is represented using the 1st base matrix and the 2nd base matrix, it can be represented as Formula 19.

$$W = \begin{bmatrix} W_1 & 0 \\ 0 & W_1 \end{bmatrix} = \begin{bmatrix} I & I \\ aI & -aI \end{bmatrix} = \begin{bmatrix} W_1 & W_1 \\ aW_1 & -aW_1 \end{bmatrix} \quad \text{[Formula 19]}$$

The codebook expressed using the inner product like Formula 19 can be simplified into Formula 20 using Kroneker product.

$$W = W_2 \otimes W_1 (W_1 : 4 \times N, W_2 : 2 \times M) \quad \text{[Formula 20]}$$

In Formula 20, a precoding matrix included in a codebook W includes 4*2 rows and N*M columns. Hence, it can be used as a codebook for 8 Tx antennas and transmission of Rank 'N*M'. For instance, in case of configuring a codebook for 8 Tx antennas and transmission of Rank R, if W2 is configured with 2×M, a value N for W1 becomes R/M. For instance, in case of configuring a codebook for 8 Tx antennas and transmission of Rank 4, if W2 is configured with 2×2 (i.e., M=2) matrix (e.g., the matrix shown in Formula 13), W1 may apply 4×2 (i.e., N=R/M=4/2=2) matrix (e.g., DFT matrix).

Codebook Structure (2)

Another method of configuring a codebook for 8 Tx antennas by combination of 2 base matrixes is described as follows. Assuming that the 2 base matrixes are set to W1 and W2, respectively, a precoding matrix W for configuring a codebook may be defined in form of W1*W2. For Rank 1 to Rank 8, W1 may be able to have such a form of a block diagonal matrix as $$\begin{bmatrix} X & 0 \\ 0 & X \end{bmatrix}.$$

For Rank 1 to Rank 4, X corresponding to a block of a block diagonal matrix W1 may be configured with a matrix in size of 4×Nb. And, 16 4Tx DFT beams can be defined for the X. In this case, beams indexes may be given as 0, 1, 2, . . . , and 15, respectively. For each W1, the adjacent overlapping beams may be usable to reduce an edge effect in frequency-selective precoding. Hence, even if a codebook is configured using the same W1 for an identical or different W2, optimal performance can be secured for several subbands.

For Rank 1 and Rank 2, X corresponding to a block diagonal matrix W1 may be configured with a matrix in size of 4×4 (i.e., Nb=4). For each of Rank 1 and Rank 2, 8 W1 matrixes can be defined. And, one W1 may include beams overlapping with the adjacent W1. In case that beam indexes are given as 0, 1, 2, . . . , and 15, respectively, for example, it is able to configure 8 W1 matrixes, of which beams overlapping with the adjacent W1 matrix, such as {0, 1, 2, 3}, {2, 3, 4, 5}, {4, 5, 6, 7}, {6, 7, 8, 9}, {8, 9, 10, 11}, {10, 11, 12, 13}, {12, 13, 14, 15}, and {14, 15, 0, 1}. For instance, a W1 codebook for Rank 1 or Rank 2 may be defined as Formula 21.

$$X^{(n)} = \frac{1}{2} \times \begin{bmatrix} 1 & 0 & 0 & 0 \\ 0 & e^{j\frac{\pi}{4}n} & 0 & 0 \\ 0 & 0 & e^{j(2)\frac{\pi}{4}n} & 0 \\ 0 & 0 & 0 & e^{j(3)\frac{\pi}{4}n} \end{bmatrix} \quad \text{[Formula 21]}$$

$$\begin{bmatrix} 1 & 1 & 1 & 1 \\ 1 & e^{j\frac{\pi}{8}} & e^{j(2)\frac{\pi}{8}} & e^{j(3)\frac{\pi}{8}} \\ 1 & e^{j(2)\frac{\pi}{8}} & e^{j(2)(2)\frac{\pi}{8}} & e^{j(3)(2)\frac{\pi}{8}} \\ 1 & e^{j(3)\frac{\pi}{8}} & e^{j(2)(3)\frac{\pi}{8}} & e^{j(3)(3)\frac{\pi}{8}} \end{bmatrix},$$

$$n = 0, 1, 2, \ldots, 7$$

$$W_1^{(n)} = \begin{bmatrix} X^{(n)} & 0 \\ 0 & X^{(n)} \end{bmatrix},$$

$$CB_1 = \{W_1^{(0)}, W_1^{(1)}, W_1^{(2)}, \ldots, W_1^{(7)}\}$$

In Formula 21, X(n) corresponding to a block of a block diagonal matrix W1(n) is defined and a W1 codebook (CB1) can be configured with 8 different W1's.

Considering the selection and common-phase component of W2, the selection of 4 kinds of different matrixes is possible for Rank 1 and 4 kinds of different QPSK co-phases are applicable for Rank 1. Hence, total 16 W2 matrixes can be defined. For instance, the W2 codebook (CB2) for Rank 1 can be configured as Formula 22.

$$W_2 \in CB_2 = \quad \text{[Formula 22]}$$

$$\left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

For Rank 2, the selection of 4 kinds of different matrixes is possible and 2 kinds of different QPSK co-phases are applicable. Hence, total 8 W2 matrixes can be defined. For instance, the W2 codebook (CB2) for Rank 2 can be configured as Formula 23.

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\} \quad \text{[Formula 23]}$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

Subsequently, for Rank 3 and Rank 4, X corresponding to a block diagonal matrix W1 may be configured with a matrix in size of 4×8 (i.e., Nb=8). For each of Rank 3 and Rank 4, 4 W1 matrixes can be defined. And, one W1 may include beams overlapping with the adjacent W1. In case that beam indexes are given as 0, 1, 2, . . . , and 15, respectively, for example, it is able to configure 4 W1 matrixes, of which beams overlapping with the adjacent W1 matrix, such as {0,1,2, . . . , 7}, {4,5,6, . . . , 11}, {8,9,10, . . . , 15}, and {12, . . . , 15,0, . . . , 3}. For instance, a W1 codebook for Rank 3 or Rank 4 may be defined as Formula 24.

$$X^{(n)} = \frac{1}{2} \times \begin{bmatrix} 1 & 0 & 0 & 0 \\ 0 & (j)^n & 0 & 0 \\ 0 & 0 & (-1)^n & 0 \\ 0 & 0 & 0 & (-j)^n \end{bmatrix}$$ [Formula 24]

$$\begin{bmatrix} 1 & 1 & 1 & \cdots & 1 \\ 1 & e^{j\frac{\pi}{8}} & e^{j(2)\frac{\pi}{8}} & \cdots & e^{j(7)\frac{\pi}{8}} \\ 1 & e^{j(2)\frac{\pi}{8}} & e^{j(2)(2)\frac{\pi}{8}} & \cdots & e^{j(7)(2)\frac{\pi}{8}} \\ 1 & e^{j(3)\frac{\pi}{8}} & e^{j(2)(3)\frac{\pi}{8}} & \cdots & e^{j(7)(3)\frac{\pi}{8}} \end{bmatrix},$$

$$n = 0, 1, 2, 3$$

$$W_1^{(n)} = \begin{bmatrix} X^{(n)} & 0 \\ 0 & X^{(n)} \end{bmatrix},$$

$$CB_1 = \{W_1^{(0)}, W_1^{(1)}, W_1^{(2)}, W_1^{(3)}\}$$

In Formula 24, X(n) corresponding to a block of a block diagonal matrix W1(n) is defined and a W1 codebook (CB1) can be configured with 4 different W1's.

Considering the selection and common-phase component of W2, the selection of 8 kinds of different matrixes is possible for Rank 3 and 2 kinds of different QPSK co-phases are applicable for Rank 3. Hence, total 16 W2 matrixes can be defined. For instance, the W2 codebook (CB2) for Rank 3 can be configured as Formula 25.

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$ [Formula 25]

$$(Y_1, Y_2) \in \begin{Bmatrix} (e_1[e_1 \ e_5]), (e_2[e_2 \ e_6]), \\ (e_3[e_3 \ e_7]), (e_4[e_4 \ e_8]), \\ (e_5[e_1 \ e_5]), (e_6[e_2 \ e_6]), \\ (e_7[e_3 \ e_7]), (e_8[e_4 \ e_8]) \end{Bmatrix}$$

In Formula 24, en indicates 8×1 vector, nth element has a value of 1, and the rest of elements mean a selection vector having a value of 0.

For Rank 4, the selection of 4 kinds of different matrixes is possible and 2 kinds of different QPSK co-phases are applicable. Hence, total 8 W2 matrixes can be defined. For instance, the W2 codebook (CB2) for Rank 4 can be configured as Formula 26.

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$ [Formula 26]

$$Y \in \{[e_1 \ e_5], [e_2 \ e_6], [e_3 \ e_7], [e_4 \ e_8]\}$$

For Rank 5 to Rank 8, X corresponding to a block of a block diagonal matrix W1 can be configured with DFT matrix in size of 4×4 and one W1 matrix can be defined. W2 may be defined as a product of a matrix $$\begin{bmatrix} I & I \\ I & -I \end{bmatrix}$$

and a row selection matrix in a fixed size of 8×r. For Rank 5, since selection of 4 kinds of different matrixes is possible, 4 W2 matrixes can be defined. For Rank 6, since selection of 4 kinds of different matrixes is possible, 4 W2 matrixes can be defined. For Rank 7, since selection of 1 kind of a matrix is possible, one W2 matrix can be defined. For Rank 8, since selection of 1 kind of a matrix is possible, one W2 matrix can be defined. In this case, the matrix $$\begin{bmatrix} I & I \\ I & -I \end{bmatrix}$$

is introduced to enable all polarized groups for each transmission layer to be identically used and good performance may be expected for a transmission of a high rank having a spatial channel having more scattering. In this case, the I means an identity matrix.

For instance, the W1 codebook or the W2 codebook for Rank 5 to Rank 8 can be defined as Formula 27.

$$X = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$ [Formula 27]

$$W_1 = \begin{bmatrix} X & 0 \\ 0 & X \end{bmatrix},$$

$$CB_1 = \{W_1\}$$

$$W_2 \in CB_2 = \left\{ \frac{1}{\sqrt{2}} \begin{bmatrix} I_4 & I_4 \\ I_4 & -I_4 \end{bmatrix} Y \right\}$$

In Formula 27, the W1 codebook for Rank 5 to Rank 8 is configured with one W1 matrix only. I4 in the W2 codebook for Rank 5 to Rank 8 means an identity matrix in size of 4×4. In Formula 27, a matrix Y can be defined as one of Formula 28 to Formula 31 for example.

The matrix Y for Rank 5 can be defined as Formula 28.

$$Y \in \left\{ \begin{bmatrix} e_1 & e_2 & e_3 & e_4 & e_5 \end{bmatrix}, \begin{bmatrix} e_2 & e_3 & e_4 & e_5 & e_6 \end{bmatrix}, \\ \begin{bmatrix} e_3 & e_4 & e_5 & e_6 & e_7 \end{bmatrix}, \begin{bmatrix} e_4 & e_5 & e_6 & e_7 & e_8 \end{bmatrix} \right\}$$ [Formula 28]

The matrix Y for Rank 6 can be defined as Formula 29.

$$Y \in \left\{ \begin{bmatrix} e_1 & e_2 & e_3 & e_4 & e_5 & e_6 \end{bmatrix}, \\ \begin{bmatrix} e_2 & e_3 & e_4 & e_5 & e_6 & e_7 \end{bmatrix}, \\ \begin{bmatrix} e_3 & e_4 & e_5 & e_6 & e_7 & e_8 \end{bmatrix}, \\ \begin{bmatrix} e_4 & e_5 & e_6 & e_7 & e_8 & e_1 \end{bmatrix} \right\}$$ [Formula 29]

The matrix Y for Rank 7 can be defined as Formula 30.

$$Y = [e_1 e_2 e_3 e_4 e_5 e_6 e_7]$$ [Formula 30]

The matrix Y for Rank 8 can be defined as Formula 31.

$$Y = I_8$$ [Formula 31]

In Formula 31, the I8 means 8×8 identity matrix.

As mentioned in the foregoing description, the numbers of W1's, which can be defined for each of Rank 1 to Rank 8, are added up to result in 28 (=8+8+4+4+1+1+1+1).

The present invention relates to a technique in which a serving cell transmits resource allocation information about a sounding reference signal (SRS) of a UE and location information of the UE to eNBs around which a 2-dimensional active antenna system (2D-AAS) is installed, based on a 3D MIMO system in which the 2D-AAS is installed, for efficient handover of the UE.

After LTE Rel-12, introduction of an antenna system using an AAS is being attempted. The AAS includes active antennas each including an active circuit and may be more efficiently used to reduce interference or perform beamforming by varying an antenna pattern according to circumstance.

Figure 24:
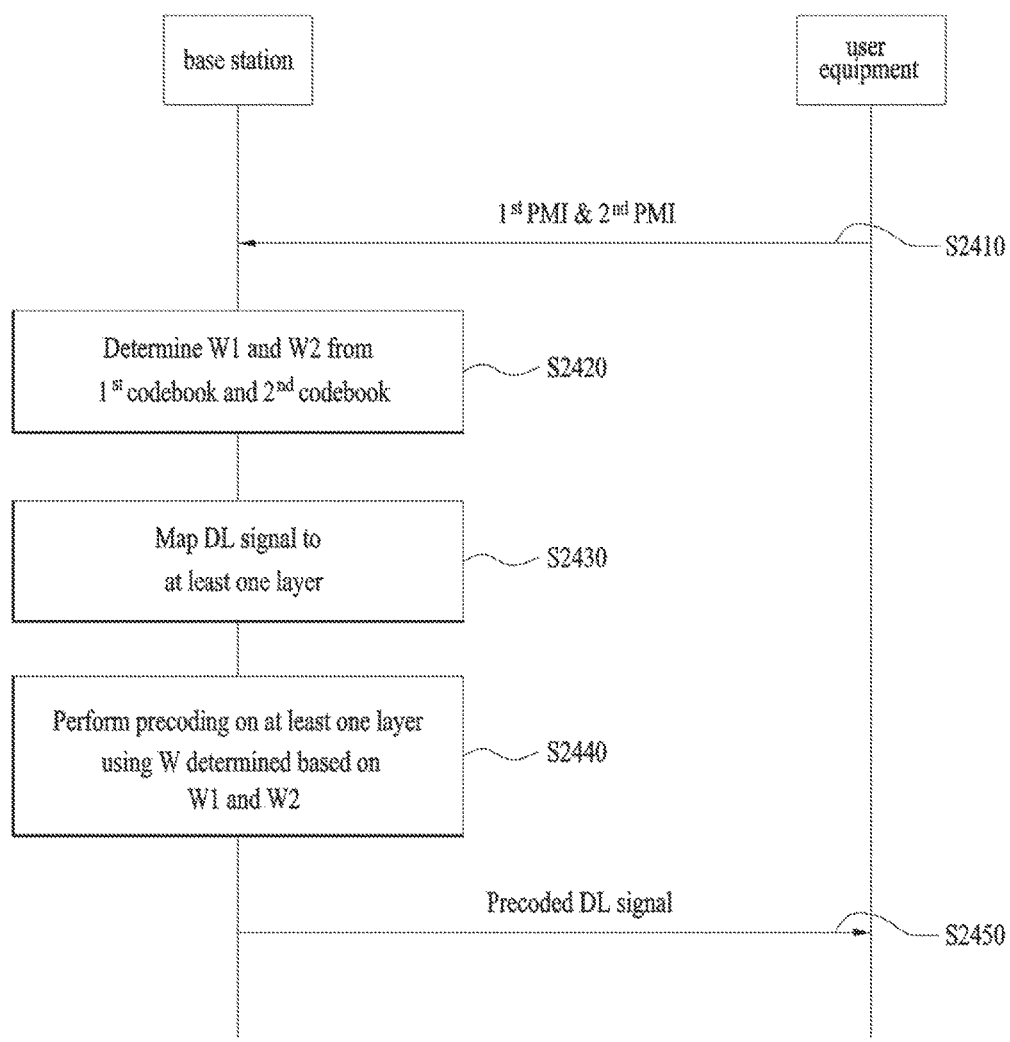
FIG. 24 is a diagram referred to in explaining a multi-dimensional active antenna system (AAS).

FIG. 24 is a diagram referred to in explaining a multi-dimensional AAS. For example, a 2D-AAS is predicted to establish a plurality of antenna systems by installation of antennas in a vertical direction and a horizontal direction as illustrated in FIG. 24.

If the AAS is established by the 2D-AAS, a main lobe of antennas may adjust a beam direction even in a vertical plane as well as in a horizontal plane in terms of antenna pattern, thereby more efficiently enabling three-dimensional beam adaptation. Then, it is possible to actively vary a transmission beam according to the location of a UE.

If the 2D-AAS is introduced, UEs calculate a reference signal received power (RSRP) for handover. The RSRP is calculated using a CRS and the CRS is not always used by all antenna ports due to an overhead problem.

For example, when 64 antenna ports are present as illustrated in FIG. 24, a weight which is applied to a constant beam in a vertical direction is applied to 8 vertical antenna ports. There is a high probability that part of 8 horizontal antenna ports transmit CRSs to a UE because excessive overhead occurs if 64 antenna ports transmit the CRSs.

Figure 25:
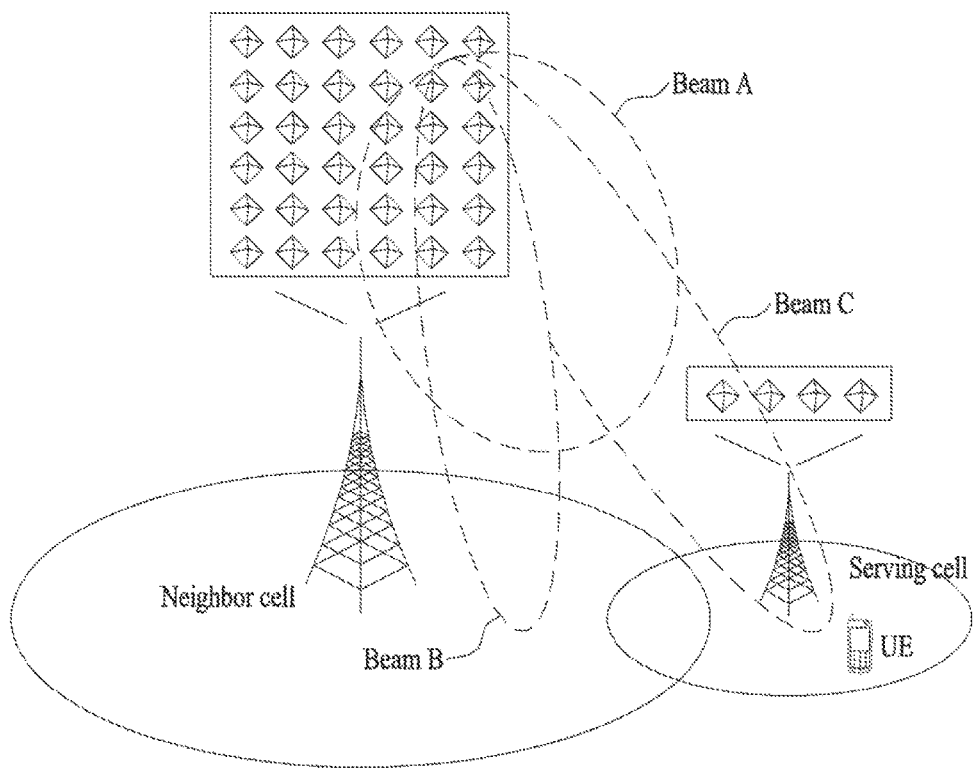
FIG. 25 is a diagram referred to in explaining CRS transmission when a 2D-AAS is used.

FIG. 25 is a diagram referred to in explaining CRS transmission when a 2D-AAS is used. In more detail, referring to FIG. 25, a UE is located near a serving cell having four antennas and a neighbor cell includes a 2D-AAS eNB having a total of 36 antenna elements in which 6 antenna elements in a vertical direction and 6 antenna elements in a horizontal direction are included.

The UE shown in FIG. 25 performs handover by comparing an RSRP of the cell thereof and an RSRP of the neighbor cell. If the neighbor cell uses one direction beam, B, as a CRS beam due to the above-described CRS overhead problem, there is a high probability that the UE may not perform handover due to a wrong RSRP although the UE receives a beam C of the neighbor cell. To solve a CRS problem caused by a specific beam direction, if the CRS beam is carried on one vertical antenna element without applying a weight to antennas of a vertical direction, a thick beam such as a beam A is formed and the overall power of the beam is weakened. Accordingly, although the UE may receive the beam C of the neighbor cell, the UE determines handover without such consideration. To solve this problem, although the UE may use several CRS beams or CSI-RS beams, overhead may occur due to increased RS transmission.

Therefore, the present invention proposes a new handover method for improving inaccurate CRS based handover when eNBs including a 2D-AAS are installed.

Figure 26:
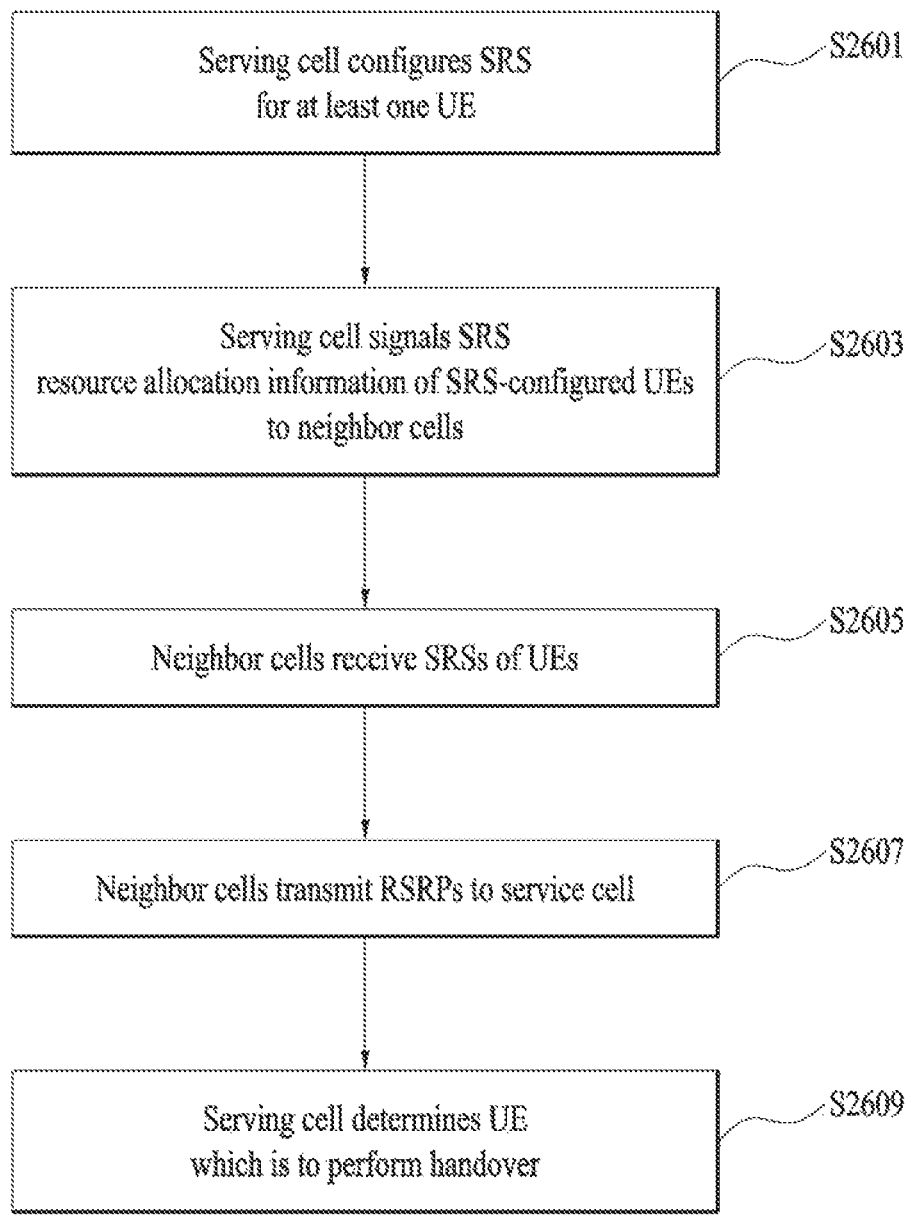
FIG. 26 is a diagram illustrating an embodiment of the present invention.

FIG. 26 is a diagram illustrating an embodiment of the present invention. The present invention will now be described with reference to FIG. 26.

In step S2601, a serving cell configures an SRS for at least one UE (located therein).

In step S2603, the serving cell may signal SRS configuration (e.g., information about a resource to which the SRS is allocated) for the UEs to neighbor cells. In this case, the serving cell may signal location information of the UEs as well.

Although the serving cell may transmit the SRS configuration information and the UE location information to the neighbor cells, the serving cell may perform transmission only when the neighbor cells correspond to eNBs equipped with a 2D-AAS in which there is a high probability that an RSRP is inaccurate.

In addition, the serving cell transmits information capable of estimating the location of the UE to some degree and this information may be i) PMI information/weight information about a channel between the UE and the serving cell or ii) PMI information/weight information about an antenna in a vertical direction when the serving cell is equipped with the 2D-AAS. Alternatively, the information about the location of the UE may be iii) GPS information of the UE or iv) information about a region in which the UE is expected to be currently located. Such information approximately indicates the location between the serving cell and the UE, making it possible for the neighbor cells to estimate an approximate location of the UE. Furthermore, the information may be used during application of a receiving vector for more accurate RSRP when neighbor cells receive the SRS of the UE.

In step S2605, the neighbor cells receive SRSs of the UEs. In this case, the neighbor cells may receive the SRSs of the UEs by applying a receiving vector capable of receiving the SRSs of the UEs as efficiently as possible, using the location information of the UEs received in step S2603.

That is, in step S2605, the neighbor cells receive the SRSs of the UEs using the SRS resource configuration of the UEs received in step S2603. In this case, the neighbor cells estimate RSRPs of the UEs as accurately as possible by applying the receiving vector according to PMI information or weight information of a vertical/horizontal direction, GPS information, or region information, for the location information of the UEs, transmitted by the serving cell. Therefore, the neighbor cells estimate SRS based RSRPs to which the receiving vector is applied.

If the PMI information or weight information of a vertical/horizontal direction, the GPS information, or the region information, for the location information of the UEs, is not transmitted by the serving cell, the neighbor cells may apply the receiving vector by estimating a region covered by the serving cell.

In step S2607, the neighbor cells transmit the SRS based RSRPs to which the receiving vector is applied in step 2605 to the serving cell.

In step S2607, the neighbor cells transmit the SRS based RSRPs to which the receiving vector is applied in step S2605 to the serving cell. According to the present invention, reference signal received quality (RSRQ) may be used instead of the RSRP. Since the RSRQ further considers total received signal strength relative to the RSRP, the serving cell has an advantage of recognizing a channel state in more detail.

In S2609, the serving cell determines a specific UE that is to perform handover among the UEs, based on the SRS based RSRPs to which the receiving vector is applied in step S2607 and directs the determined specific UE to perform handover.

For example, a serving eNB compares an SRS based RSRP measured by the serving cell and an SRS based RSRP measured by the neighbor cell. If the RSRP measured by the neighbor cell is greater than the RSRP measured by the serving cell by a prescribed level or more, the serving eNB may determine that handover is needed.

While it is assumed in the present invention that handover is performed in step S2609, there may be a difference in channel between UL and DL and an interference environment may also differ in UL and DL. Accordingly, even if handover is determined in step S2609, an additional confirmation procedure may be needed. For such a confirmation procedure, a cell to which a UE is handed over transmits a precoded CSI-RS using a receiving vector vector calculated in step S2605 to the UE that is determined to perform handover. To this end, the serving eNB may signal CSI-RS configuration (e.g., a configuration index, a transmission period, etc.) of each cell to the UE and request that the UE perform measurement. In this case, the serving cell may configure a CSI-RS therefor and a CSI-RS for the neighbor cell. The neighbor cell and the serving cell may transmit CSI-RSs to which respective precoding is applied to respective CSI-RS resources.

Upon receiving the CSI-RSs for handover confirmation, the UE may determine whether handover is proper based on a received beam and report a determined result to the serving cell or transmit a confirmation message to the serving cell. For example, the UE compares RSRPs for respective CSI-RSs and, if a difference between the RSRPs is equal to or greater than a given level, the UE may confirm handover. If the difference is less than a given level or an absolute specific number (e.g., a level at which it is difficult to perform communication), the UE may deny a corresponding handover command.

Therefore, according to the present invention, receiving powers of the UEs may be more accurately measured in step S2605 and SRS based RSRPs are measured in consideration of the measured receiving powers, thereby accurately performing handover relative to legacy handover.

Hereinafter, a method in which a neighbor cell determines a receiving vector in step S2603 and step S2605 of the present invention will be described in more detail.

In step S2603, the serving cell may transmit, to the neighbor cells, information about at least one of i) weight/PMI information about a horizontal antenna of the UE, ii) weight/PMI information about a vertical antenna of the UE, iii) GPS information of the UE, iv) GPS information of the UE, v) information indicating absence (null) of location information of the UE.

The case in which the serving cell informs the neighbor cells of the weight/PMI information of the horizontal direction of the UE will be described first. For example, it is assumed that the serving cell informs the neighbor cells of the weight/PMI information of the horizontal direction of the UE and this information is always based on rank 1. Since whether weight/PMI information based on rank 1 is stored in each UE is uncertain, the serving cell may additionally request that the UE transmit the weight/PMI information based on rank 1. Although the serving cell may request that all UEs transmit weight/PMI information, the serving cell checks whether prestored weight/PMI information is present and requests that only UEs that do not store weight/PMI information transmit weight/PMI information, thereby reducing signaling overhead.

Figure 27:
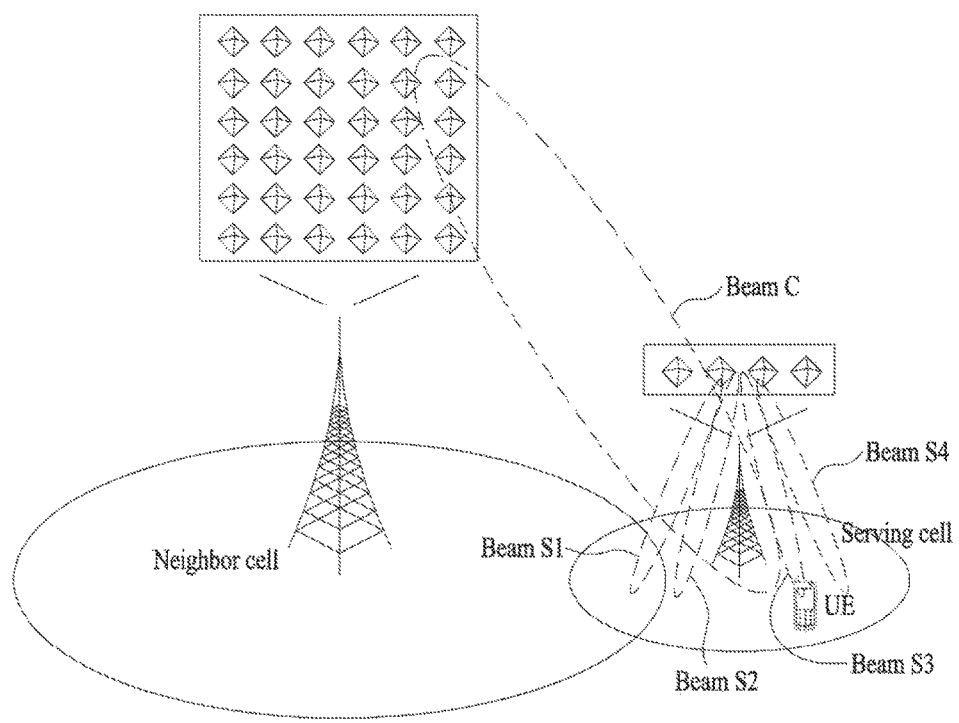
FIG. 27 and FIG. 28 are diagrams referred to in explaining the case in which a neighbor cell estimates a beamforming state of a serving cell according to the present invention.
Figure 28:
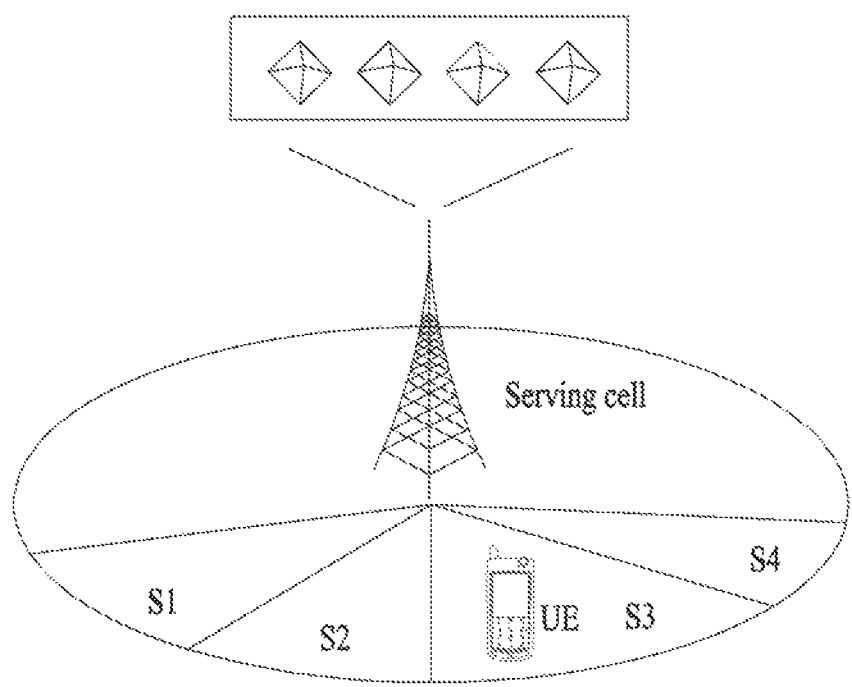

FIG. 27 and FIG. 28 are diagrams referred to in explaining the case in which a neighbor cell estimates a beamforming state of a serving cell according to the present invention.

Referring to FIG. 27, a UE has a high probability of using a beam S3 between a serving cell and the UE as a weight vector/PMI. In FIG. 27, it is assumed that the serving cell operates with four PMIs forming beams S1, S2, S3, and S4, respectively. In this case, in step S2605, the serving cell informs a neighbor cell of PMI information about the beam S3. The neighbor cell may be aware of whether the beam S3 illuminated by the serving cell forms the best beam for the UE, through the information about the received beam S3.

Additionally, referring to FIG. 28, the neighbor cell may estimate a region towards which a large quantity of beam is illuminated by the serving cell. PMI Information about a region such as $S_i$ (i.e., S1 to S4), illustrated in FIG. 28, may differ according to the height of an eNB of the serving cell and the length between antenna elements of the serving cell or the length between antenna ports. Accordingly, it is assumed that information about a region towards which a beam of the serving cell is illuminated is preshared by eNBs.

Assuming that the eNBs are previously aware of the location of a weight center of each region, the location of the weight center of a region illuminated by each beam Si (where i is a region index) is defined as $C_{S_i}=(\alpha_i, \beta_i, \gamma_i)$ In this case, $\alpha_i$, $\beta_i$, and $\gamma_i$ denote x, y, and z coordinates of the weight center of each illuminated region, respectively. The serving cell may transmit such information of $C_{S_i}$ to the neighbor cell instead of PMI/weight information.

The neighbor cell may determine a receiving vector by a weight vector at which a beam best illuminates the location $C_{S_i}=(\alpha_i, \beta_i, \gamma_i)$ based on the information of $C_{S_i}=(\alpha_i, \beta_i, \gamma_i)$ and location information of an eNB thereof (i.e., the neighbor cell).

Figure 29:
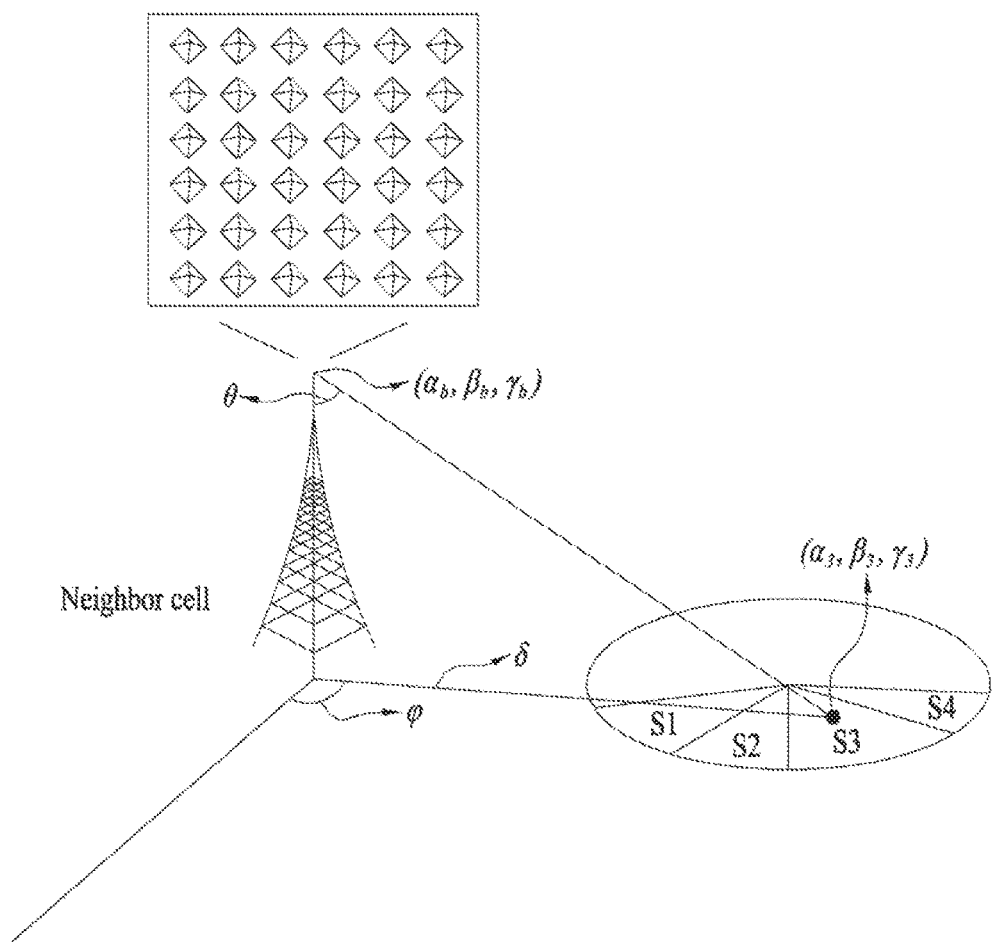
FIG. 29 is a diagram illustrating the case in which a neighbor cell adaptively performs beamforming based on region information according to the present invention.

FIG. 29 illustrates the case in which a neighbor cell adaptively performs beamforming based on region information according to the present invention. Referring to FIG. 29, an eNB of the neighbor cell is aware of $C_{S_3}=(\alpha_3, \beta_3, \gamma_3)^3$ transmitted by a serving cell. It is assumed that the eNB of the neighbor cell is also aware of $(\alpha_b, \beta_b, \gamma_b)$ which is location information thereof (i.e., neighbor cell). Based on the above information, the neighbor cell may easily calculate θ and φ in a global coordinate system. θ denotes an angle of a vertical direction in the global coordinate system and φ denotes an angle of a horizontal direction in the global coordinate system. According to a direction of an antenna of the eNB, the angles θ and φ are transformed into angles θ' and φ' in a local coordinate system. Then, the neighbor cell may calculate a receiving vector vector as indicated by Formula 32.

$$w_{m,n} = \exp\left(-2\pi \cdot j \cdot \left((n-1) \cdot \frac{d_v}{\lambda} \cdot \cos(\theta') + (m-1) \cdot \frac{d_h}{\lambda} \cdot \sin(\theta') \cdot \sin(\varphi')\right)\right) \quad [\text{Formula 32}]$$

Formula 32 indicates that a beam in a direction of θ' and φ' is received with the highest energy. In Formula 32, m and n denote antenna element numbers of a horizontal axis and a vertical axis, respectively. $d_v$ and $d_h$ denote spacing between vertical antennas and spacing between horizontal antennas, respectively and λ denotes a wavelength of a radio wave (λ=c/f where c is the speed of light and f is a frequency of a radio wave).

In addition, it is assumed that the serving cell is equipped with a 2D-AAS and informs the neighbor cell of the above-described weight/PMI information of the horizontal direction and vertical direction of the UE (i.e., information of i) and ii)) and this information is always based on rank 1. In this case, since it is uncertain whether weight/PMI information based on rank 1 is stored in each UE, the serving cell may additionally request that a UE transmit the weight/PMI information based on rank 1.

Figure 30:
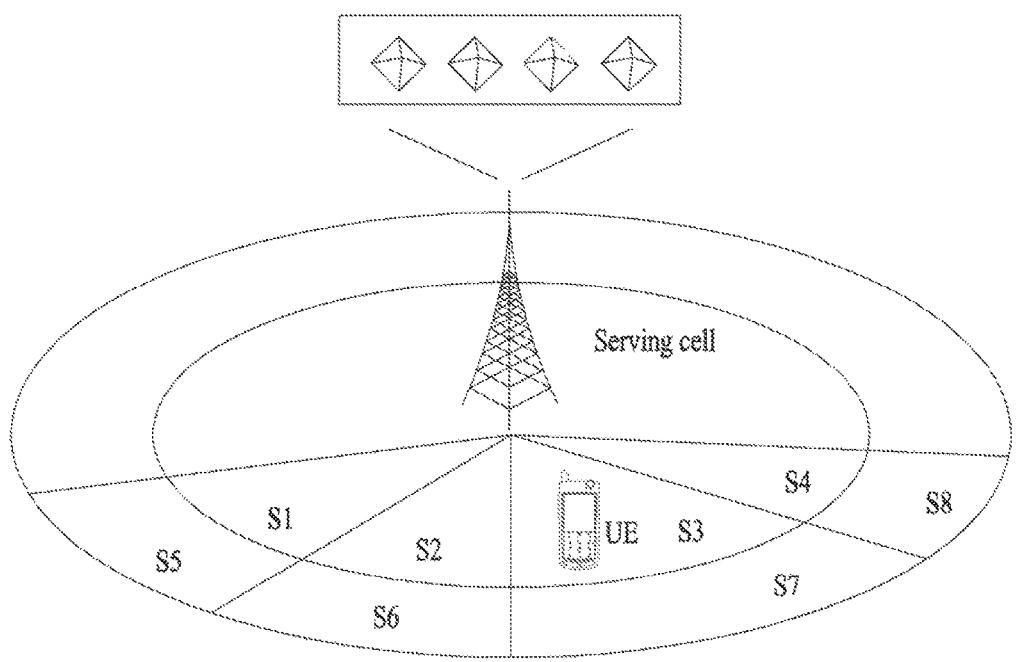
FIG. 30 is a diagram referred to in explaining the case in which weight/PMI information of a horizontal direction and a vertical direction is transmitted according to the present invention.

FIG. 30 is a diagram referred to in explaining the case in which weight/PMI information of a horizontal direction and a vertical direction is transmitted according to the present invention. Referring to FIG. 30, a neighbor cell estimates which region each beam of a serving cell mainly illuminates. In FIG. 30, it is assumed that there are four PMIs/weight vectors that generate beams of a horizontal direction and two PMIs/weight vectors that generate beams of a vertical direction.

Accordingly, 8 regions are present for beams in FIG. 30. Information about the region as illustrated in FIG. 30 through PMIs may differ according to the height of an eNB of the serving cell and the length between antenna elements of the serving cell or the length between antenna ports. Accordingly, it is assumed that information about a region towards which a beam of the serving cell is illuminated is preshared by eNBs.

Assuming that the eNBs are previously aware of the location of a weight center of each region, the location of the weight center of a region illuminated by each beam Si (where i is a region index) is defined as $C_{S_i}=(\alpha_i,\beta_i,\gamma_i)$. In this case, $\alpha_i$, $\beta_i$, and $\gamma_i$ denote x, y, and z coordinates of the weight center of each illuminated region, respectively. The serving cell may transmit such information of $C_{S_i}$ to a neighbor cell instead of PMI/weight information.

The neighbor cell may determine a receiving vector by a weight vector at which a beam best illuminates the location $C_{S_i}=(\alpha_i,\beta_i,\gamma_i)$ based on the information of $C_{S_i}=(\alpha_i,\beta_i,\gamma_i)$ and location information of an eNB thereof (i.e., the neighbor cell).

For example, the neighbor cell is aware of $C_{S_3}=(\alpha_3,\beta_3,\gamma_3)$ transmitted by the serving cell as in FIG. 29 and it is assumed that the neighbor cell is also aware of $(\alpha_b,\beta_b,\gamma_b)$ which is location information thereof (i.e., the neighbor cell). Based on the above information, the neighbor cell may easily calculate θ and φ in a global coordinate system. θ denotes an angle of a vertical direction in the global coordinate system and φ denotes an angle of a horizontal direction in the global coordinate system. According to a direction of an antenna of an eNB, the angles θ and φ are transformed into angles θ' and φ' in a local coordinate system. Then, the neighbor cell may calculate a receiving vector vector as indicated by Formula 32. As described above, Formula 32 indicates that a beam in a direction of θ' and φ' is received with the highest energy.

As another example, the serving cell may inform the neighbor cell of GPS information of a UE. The eNB may receive the GPS information of the UE by frequently requesting that the UE transmit the GPS information of the UE. The serving cell transmits $(\alpha_i,\beta_i,\gamma_i)$ which is the GPS information of the UE to the neighbor cell.

The neighbor cell may determine a receiving vector by a weight vector at which a beam best illuminates the location $(\alpha_i,\beta_i,\gamma_i)$ based on the information of $(\alpha_i,\beta_i,\gamma_i)$ and location information of an eNB thereof.

For example, the neighbor cell is aware of $(\alpha_i,\beta_i,\gamma_i)$ transmitted by the serving cell as in FIG. 29 and it is assumed that the neighbor cell is also aware of $(\alpha_b,\beta_b,\gamma_b)$ which is location information thereof. Then, the neighbor cell may easily calculate θ and φ of FIG. 29 in a global coordinate system. Since θ and φ denote angles in the global coordinate system, the angles θ and φ are transformed into angles θ' and φ' in a local coordinate system according to a direction of an antenna of an eNB. Then, the neighbor cell may calculate a receiving vector vector using Formula 32. That is, as described above, a beam in a direction of θ' and φ' may be received with the highest energy using Formula 32.

As still another example, the serving cell may inform the neighbor cell of region information of a UE. The region information of the UE may be defined as information about a region to which the UE belongs when the serving cell is divided into a plurality of regions as illustrated in FIG. 30.

Assuming that eNBs are previously aware of the location of a weight center of each region of the serving cell, the location of the weight center of a region illuminated by each beam Si is defined as $C_{S_i}=(\alpha_i,\beta_i,\gamma_i)$. In this case, $\alpha_i$, $\beta_i$, and $\gamma_i$ denote x, y, and z coordinates of the weight center of each illuminated region, respectively. The neighbor cell may determine a receiving vector by a weight vector at which a beam best illuminates the location $C_{S_i}=(\alpha_i,\beta_i,\gamma_i)$ based on the information of $C_{S_i}=(\alpha_i,\beta_i,\gamma_i)$ and location information thereof.

For example, the neighbor cell is aware of $C_{S_3}=(\alpha_3,\beta_3,\gamma_3)$ transmitted by the serving cell as in FIG. 29 and it is assumed that the neighbor cell is also aware of $(\alpha_b,\beta_b,\gamma_b)$ which is location information thereof. Based on this information, the neighbor cell easily calculates θ and φ of FIG. 29 in a global coordinate system. Since θ and φ denote angles in the global coordinate system, the angles θ and φ are transformed into angles θ' and φ' in a local coordinate system according to a beam direction caused by an antenna of the neighbor cell. Then, the neighbor cell may calculate a receiving vector vector using Formula 32. That is, as described above, a beam in a direction of θ' and φ' may be received with the highest energy using Formula 32.

As the last example, it is assumed that the serving cell does not transmit information of the UE. In this case, it is assumed that the eNBs are previously aware of the location of a weight center of an entire region covered by the serving cell and the location is defined as $(\alpha_i,\beta_i,\gamma_i)$.

The neighbor cell may determine a receiving vector by a weight vector at which a beam best illuminates the location $(\alpha_i,\beta_i,\gamma_i)$ based on the information of $(\alpha_i,\beta_i,\gamma_i)$ and location information of an eNB thereof.

For example, the neighbor cell is aware of $(\alpha_i,\beta_i,\gamma_i)$ transmitted by the serving cell as in FIG. 29 and it is assumed that the neighbor cell is also aware of $(\alpha_b,\beta_b,\gamma_b)$ which is location information thereof. Then, the neighbor cell may easily calculate θ and φ of FIG. 29 in a global coordinate system. Since θ and φ denote angles in the global coordinate system, the angles θ and φ are transformed into angles θ' and φ' in a local coordinate system according to a direction of an antenna of an eNB. Then, the neighbor cell may calculate a receiving vector vector using Formula 32. That is, as described above, a beam in a direction of θ' and φ' may be received with the highest energy using Formula 32.

Figure 31:
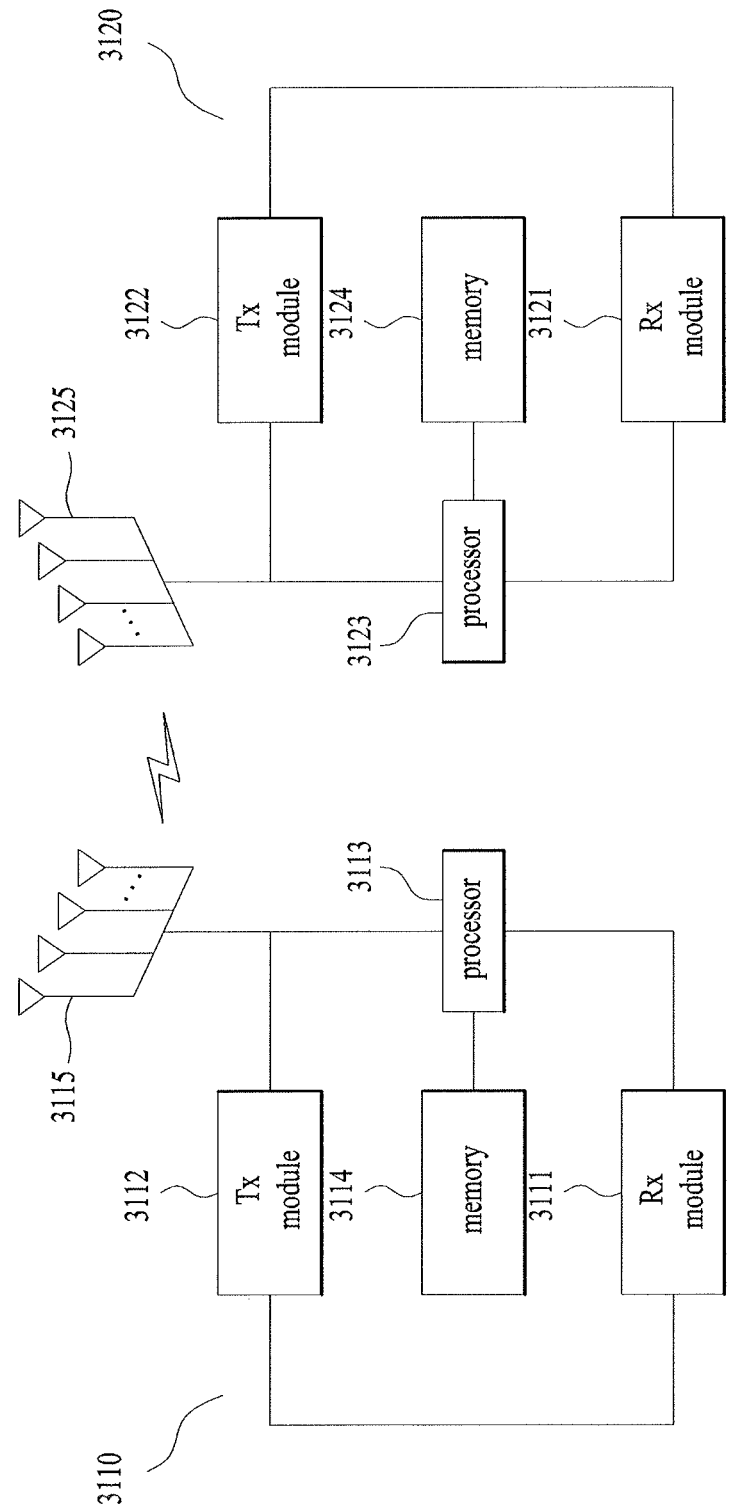
FIG. 31 is a diagram illustrating configuration of an eNB and a UE according to the present invention.

FIG. 31 is a diagram illustrating configuration of an eNB and a UE according to the present invention.

Referring to FIG. 31, the eNB 3110 according to the present invention may include an Rx module 3111, a transmission module 3112, a processor 3113, a memory 3114, and a plurality of antennas 3115. The antennas 3115 support MIMO transmission and reception. The Rx module 3111 may receive various signal, data, and information on UL from the UE. The transmission module 3112 may transmit various signals, data, and information on DL to the UE. The processor 3113 may control overall operation of the eNB 3110.

In addition, the processor 3113 of the eNB 3110 processes information received by the eNB 3110 and information to be externally transmitted. The memory 3114 may store the processed information for a predetermined time and may be replaced with a component such as a buffer (not shown).

Referring to FIG. 31, the UE 3120 according to the present invention may include an Rx module 3121, a Tx module 3122, a processor 3123, a memory 3124, and a plurality of antennas 3125. The antennas 3125 support MIMO transmission and reception. The Rx module 3121 may receive various signal, data, and information on DL from the eNB. The Tx module 3122 may transmit various signals, data, and information on UL to the eNB. The processor 3113 may control overall operation of the UE 3120.

In addition, the processor 3123 of the UE 3120 processes information received by the UE 3120 and information to be externally transmitted. The memory 3124 may store the processed information for a predetermined time and may be replaced with a component such as a buffer (not shown).

The specific configurations of the eNB and the UE apparatus may be implemented such that the various above-described embodiments of the present invention are independently performed or two or more embodiments of the present invention are simultaneously performed. Redundant matters will not be described herein for clarity.

The description of the eNB 3110 shown in FIG. 31 may be identically applied to a relay node acting as a DL transmission entity or a UL reception entity and the description of the UE 3120 may be identically applied to the relay node acting as a DL reception entity or a UL transmission entity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and novel features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

While the above-described method and apparatus supporting reference signal transmission in a wireless communication system supporting multiple antennas have been described centering on an example applied to a 3GPP LTE system, the present invention is applicable to a variety of wireless communication systems in addition to the 3GPP LTE system.

The invention claimed is:

1. A method for supporting a reference signal transmission of a neighbor cell by a serving cell in a wireless communication system supporting multiple antennas, the method comprising:
   transmitting a sounding reference signal (SRS) configuration to a user equipment (UE);
   transmitting the SRS configuration and a location information associated with the UE to the neighbor cell; and
   receiving first channel quality value based on an SRS estimated according to the SRS configuration from the neighbor cell,
   wherein the first channel quality value is estimated by applying a receiving vector according to the location information associated with the UE, and
   wherein the location information associated with the UE is configured to be transmitted only when the neighbor cell includes multi-dimensional antennas.

2. The method according to claim 1, wherein the first channel quality value is reference signal received power (RSRP) or reference signal received quality (RSRQ).

3. The method according to claim 1,
   wherein the location information associated with the UE includes at least one of weight information about a horizontal antenna of the UE, weight information about a vertical antenna of the UE, global positioning system (GPS) information of the UE, expected location information of the UE, and information indicating that location information of the UE is not present.

4. The method according to claim 1, further comprising:
   determining whether to handover the UE, by comparing the first channel quality value with a second channel quality value measured by the serving cell.

5. The method according to claim 4, further comprising:
   upon determining that the UE is handed over, transmitting a first channel state information-reference signal (CSI-RS) of the serving cell and a second CSI-RS of the neighbor cell to the UE; and
   receiving a handover confirmation message of the UE based on the first CSI-RS and the second CSI-RS.

6. The method according to claim 1,
   wherein the receiving vector is determined according to Equation A:

$$w_{m,n} = \exp\left(-2\pi \cdot j \cdot \left((n-1) \cdot \frac{d_v}{\lambda} \cdot \cos(\theta') + (m-1) \cdot \frac{d_h}{\lambda} \cdot \sin(\theta') \cdot \sin(\varphi')\right)\right) \quad \text{[Equation A]}$$

where θ' is an angle of a vertical direction in a local coordinate system, φ' is an angle of a horizontal direction in the local coordinate system, in is a horizontal-axis antenna element number of the neighbor cell, n is a vertical-axis antenna element number of the neighbor cell, $d_v$ i is a spacing between horizontal-axis antennas of the neighbor cell, $d_h$ is a spacing between vertical-axis antennas of the neighbor cell, and $\lambda$ is a wave length of a radio wave.

7. A serving cell for supporting a reference signal transmission of a neighbor cell in a wireless communication system supporting multiple antennas, the serving cell comprising:

a radio frequency (RF) unit; and a processor, wherein the processor is configured to:

control the RF unit to transmit a sounding reference signal (SRS) configuration to a user equipment (UE), control the RF unit to transmit the SRS configuration and UE associated location information to the neighbor cell, and control the RF unit to receive an SRS based first channel quality value estimated according to the SRS configuration from the neighbor cell, wherein the first channel quality value is estimated by applying a receiving vector according to the UE associated location information, and wherein the location information associated with the UE is configured to be transmitted only when the neighbor cell includes multi-dimensional antennas.

8. The serving cell according to claim 7, wherein, the UE associated location information includes at least one of weight information about a horizontal antenna of the UE, weight information about a vertical antenna of the UE, global positioning system (GPS) information of the UE, expected location information of the UE, and information indicating that location information of the UE is not present.

* * * * *